United States Patent
Ishii et al.

[11] Patent Number: 5,964,811
[45] Date of Patent: *Oct. 12, 1999

[54] CONTROL METHOD AND APPARATUS FOR DIAGNOSING VEHICLES

[75] Inventors: Toshio Ishii, Mito; Takashi Mukaihira, Katsuta; Yutaka Takaku, Katsuta; Kazuya Kawano, Katsuta; Kiyoshi Miura, Naka-gun, all of Japan

[73] Assignee: Hitachi, Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/877,857

[22] Filed: Apr. 18, 1997

Related U.S. Application Data

[63] Continuation of application No. 08/102,967, Aug. 6, 1993, abandoned.

[30] Foreign Application Priority Data

Aug. 6, 1992 [JP] Japan ..................... 4-210051

[51] Int. Cl.⁶ ...................................... G06G 7/76
[52] U.S. Cl. .................. 701/29; 701/31; 701/35; 701/114; 701/102; 73/116; 73/117.2; 340/438; 340/825.52; 123/479
[58] Field of Search .............. 364/431.01, 431.04, 364/431.03, 431.055, 423.098, 424.034, 424.037, 424.038, 424.039, 424.04, 424.045, 424.048, 550, 551.01, 131–138, 431.11, 431.12; 340/438, 439, 825.11, 825.52, 825.54; 73/117.3, 118.1, 116, 117.2; 701/35, 31, 32, 33, 114, 115, 102, 29; 123/479, 481, 436, 690, 480

[56] References Cited

U.S. PATENT DOCUMENTS

| | | |
|---|---|---|
| Re. 31,582 | 5/1984 | Hosaka et al. ............ 364/431.04 |
| 4,276,600 | 6/1981 | Hartford et al. ............ 364/431.06 |
| 4,339,801 | 7/1982 | Hosaka et al. ............ 364/431.04 |
| 4,346,443 | 8/1982 | De Angelis et al. ........ 364/431.04 |
| 4,676,215 | 6/1987 | Blöcher et al. ............ 123/489 |
| 4,926,352 | 5/1990 | Staffe ...................... 364/431.01 |
| 5,050,562 | 9/1991 | Ishii et al. ................ 123/489 |
| 5,091,856 | 2/1992 | Hasegawa et al. ......... 364/424.045 |
| 5,157,610 | 10/1992 | Asano et al. .............. 364/424.038 |
| 5,157,613 | 10/1992 | Williams et al. ........... 364/431.08 |
| 5,263,453 | 11/1993 | Wakahara et al. .......... 123/436 |
| 5,331,560 | 7/1994 | Tamura .................... 364/431.12 |
| 5,491,631 | 2/1996 | Shirane et al. ............. 364/431.11 |

FOREIGN PATENT DOCUMENTS 36 31 200  3/1988  Germany.

OTHER PUBLICATIONS

Translation of communication from German Patent Office dated Nov. 9, 1994.

*Primary Examiner*—Jacques H. Louis-Jacques
*Attorney, Agent, or Firm*—Evenson, McKeown, Edwards & Lenahan P.L.L.C.

[57] ABSTRACT

A diagnostic and control system first checks the current operation status of the vehicle engine, when a malfunction or abnormal condition is detected by diagnostic sensors. A selection of optimum corrective measures is then made and carried out taking into account the safety of the vehicle, based on current operational status of the engine. For this purpose, a set of prioritized corrective measures is determined beforehand for each of the individual monitored items, according to detected changes in the engine operating status. The individual control measures are selected considering the safety of the vehicle, possible measures to correct the malfunction, assuring vehicle operability, and maintaining appropriate engine operating parameters such as exhaust gas mixture, fuel consumption and the like.

37 Claims, 21 Drawing Sheets

CONTROL METHOD AND APPARATUS FOR DIAGNOSING VEHICLES

This application is a continuation of application Ser. No. 08/102,967, filed on Aug. 6, 1993, now abandoned.

BACKGROUND OF THE INVENTION

This invention is related to a method and apparatus for detecting and remedying malfunctions in the sensors and multiple control systems needed to control the status and operation of vehicles, and especially to a diagnosis control method for comprehensive control of the operation of vehicles, including correction of detected malfunctions, assuring the vehicle's operability, prevention of exhaust gas degradation, prevention of fuel consumption increases, and the like.

It is most important to diagnose the various functions of a vehicle from a safety standpoint, before it is driven. Much attention has thus been paid heretofore to diagnostic technology for vehicles, and various diagnostic devices and methods have been developed. For example, Japanese Patent Laid-Open No. 263241 of 1988 discloses a method of detecting accidental engine misfires (failure to fire or incomplete combustion), in which an air-fuel ratio detector output pattern and a crank point signal are used to judge whether and in which cylinder a misfire occurs. When a misfire is detected and the cylinder is identified, the supply of the fuel to that cylinder is stopped in order to prevent a degradation of the exhaust gas. Since the manner in which exhaust gas emissions will be affected most by a misfire is known, necessary countermeasures can be taken to deal with the misfire. Since no positive steps are taken to remedy the misfire, however, this process may be characterized as a passive diagnostic control.

In addition to foregoing technique for detecting misfires, other diagnostic methods are also known. These include degradation diagnosis (Japanese Patent Laid-Open No. 91440 of 1990), exhaust gas return flow control system diagnosis (Japanese Patent Laid-Open No. 210058 of 1991), $O_2$ sensor diagnosis (Japanese Patent Laid-Open No. 165558 of 1987), and secondary air suction system diagnosis (Japanese Patent Laid-Open No. 216011 of 1990). Each of the patents referred to above describes a diagnostic method or device which is in the form of a passive control. Most of the methods are purely diagnostic in nature, and are directed to assuring an accurate detection of the malfunction. While it is true that some of them, like the above described misfire detection technique, can effect minimal control measures based on the diagnostic result (such as stopping the supply of the fuel in order to avoid degradation of the exhaust gas characteristics), they still provide only a passive control of the detected problem, with no further steps being taken to actually correct it. On the other hand, since those diagnostic methods will be subject to government regulation, diagnostic technologies proper to those regulations are all the more important.

When a malfunction of some sort is detected, it is most important to determine exactly which countermeasures should be taken under the circumstances. For example, if a misfire is detected, action can be taken to restore proper firing of the cylinder. If, however, the supply of the fuel is stopped unnecessarily, this measure could needlessly lower the power output of the vehicle. If it is possible to remedy the misfire in a manner that permits continued operation of the vehicle, such a control measure is obviously desirable. Of course, this depends to a great extent on the operating status of the vehicle when the misfire is detected, which may limit the range of subsequent controls that can be used. Thus, the optimized controls should be selected sequentially from among the controls available to correct the malfunction, assure vehicle operability, maintain the exhaust gas characteristics and the current fuel consumption, and the like, by taking the safety and the operating status of the vehicle at that time into account.

Thus far, only examples of cylinder misfiring have been described. However, the range of items susceptible to such diagnosis also includes the catalyst, $O_2$ sensors, $O_2$ sensor heaters, evaporative fuel systems, EGR valves, secondary air supply, fuel control systems, and the like. The purpose of the present invention, therefore is to provide a comprehensive vehicle diagnostic control system capable of implementing positive control over operation of the subject vehicle in response to the current engine operation status when a malfunction is detected by the existing diagnostic measures.

SUMMARY OF THE INVENTION

In the diagnostic and control system according to the invention, when a malfunction or abnormal condition is detected by any of the diagnostic sensors, the current operational status of the vehicle engine is first checked. A selection of optimum corrective measures is then made and carried out taking into account the safety of the vehicle, based on the current operational status of the engine. For this purpose, a set of prioritized corrective measures is determined beforehand for each of the individual monitored items, according to detected changes in the engine operating status. The individual control measures are selected considering the safety of the vehicle, possible measures to correct the malfunction, assuring vehicle operability, and maintaining appropriate engine operating parameters such as exhaust gas mixture, fuel consumption and the like.

Unlike the conventional prior art, in which passive controls are carried out as an open loop for detected malfunctions, in the diagnostic and control system according to the invention, the current driving status of the engine is always fed back to select and carry out the controls according to the fed-back status information. In this manner, the engine output is neither lowered nor stopped needlessly due to the detected malfunction.

Other objects, advantages and novel features of the present invention will become apparent from the following detailed description of the invention when considered in conjunction with the accompanying drawings.

DETAILED DESCRIPTION OF THE DRAWINGS

Figure 2:
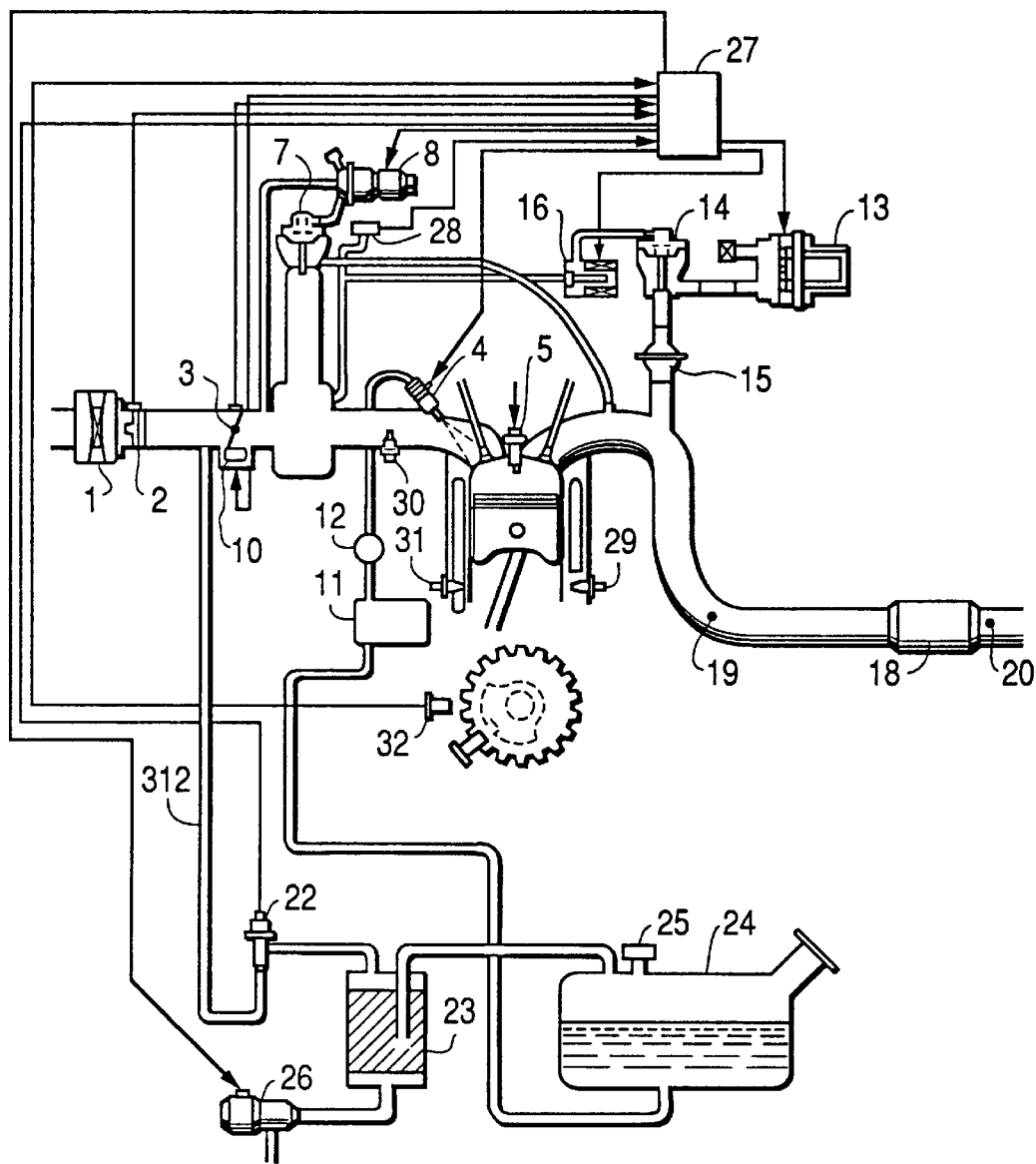
FIG. 2 illustrates the overall configuration of an engine having each of the systems diagnosed and controlled by this invention.

Referring now to the drawings, FIG. 2 shows the overall configuration of an engine having an air cleaner 1 mounted in the air inlet of a vehicle. An air flow sensor 2, also mounted in the air inlet, detects the air flow sucked into the engine, with the latter information being entered into the control unit 27. A throttle opening sensor 3 detects the extent of throttle valve opening, which is also entered to the control unit 27. A fuel injector 4 injects fuel into the engine according to the signal from the control unit 27 corresponding to the status of the fuel supply from the fuel pump 11. The signal from a fuel status sensor 12 is used to monitor and control the fuel characteristics. Ignition plug 5 receives the output signal from the ignition circuit (not shown), while an Exhaust Gas Recirculation valve 7 is used to adjust the exhaust return flow in response to a control valve 8. Reference numeral 10 designates an idling rotation control bypass valve, (a so-called ISC valve), while 13 is a secondary air pump used to supply secondary air to the exhaust pipe; 14 is an air shut-off valve; and 15 is a check valve for the air shut-off valve. A VC shut-off valve bears the reference numeral 16, and 18 indicates the catalyst set in the exhaust pipe. First and second $O_2$ sensors 19, 20 are mounted upstream and downstream of the catalyzer. A fuel tank 24 is coupled to a canister 23, which in turn is connected to an evaporative fuel control valve 22 (hereafter referred to as an evaporator purging valve). A pressure sensor 25 is provided on fuel tank 24, and the canister 23 has a drain valve 26. The air intake has a suction air pressure sensor 28 and a suction air temperature sensor 30. A cooling water temperature sensor 31, a crank sensor 32, and a knock sensor 29 are also provided.

In FIG. 2 above, the monitored diagnosis items are: engine misfires, degradation of catalyst function, $O_2$ sensor errors, $O_2$ sensor heater errors, evaporator errors, EGR function errors, secondary air supply system errors, fuel system errors, and the like. Each of these items is monitored, diagnosed and dealt with individually, according to diagnosis logic determined beforehand, taking the continued operation of the vehicle as a whole into account. The details of such diagnosis and correction for each of these types of malfunctions are set forth hereinafter.

For example, diagnosis of catalyst function is made in accordance with predetermined diagnostic logic, using the output signals from the two $O_2$ sensors 19, 20 mounted upstream and downstream of the catalyst. Then, the most appropriate controls are selected and implemented sequentially based on the current operating status of the engine and the individual diagnosis result, according to the priorities determined beforehand.

Figure 1:
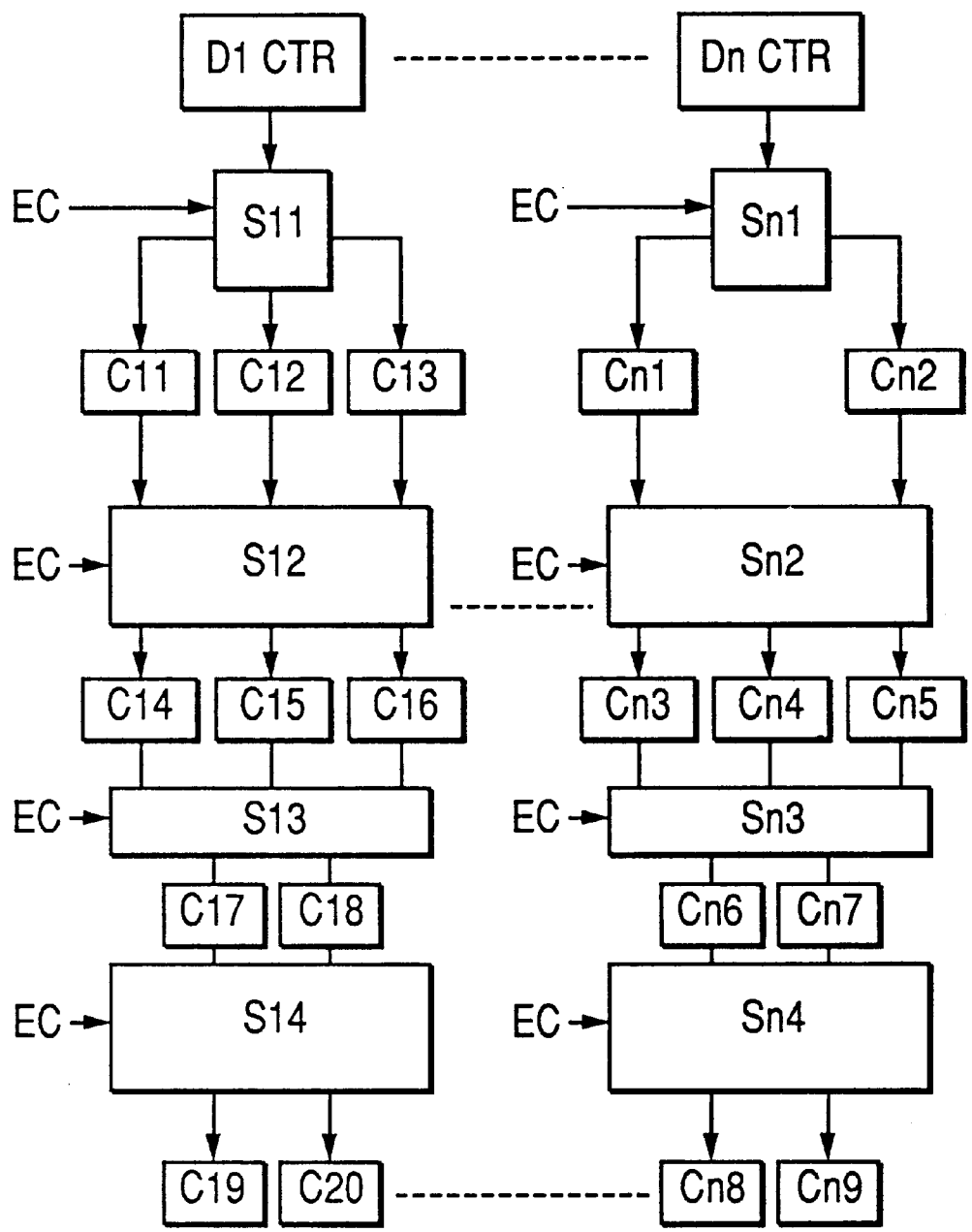
FIG. 1 is a block diagram which shows an overview of the diagnostic and control system according to the invention.

FIG. 1 is a conceptual block diagram of a typical prioritized control system of the type referred to herein. $D_1 CTR$ to $D_n CTR$ represent respective controls for each of the monitored items (1 through n) referred to above, such as for example, when a misfire or a degradation of the catalyst function is detected. EC represents data indicating the current status of the engine operation, such as the engine speed (rpm), cooling water temperature, and the like. As explained in specific examples hereinafter, if $D_1 CTR$ is assumed to represent a control to be implemented when a misfire is detected, then a first set of possible corrective measures $C_{11}$, $C_{12}$, and $C_{13}$ (control parameters) is determined in the control selector $S_{11}$ according to the status of the engine operation EC, and one of them is selected and carried out. In the next stage, one of a second set of control parameters $C_{14}$, $C_{15}$, and $C_{16}$, determined in the control selector $S_{12}$ according to the operation status EC, is selected and carried out. In the same way, one of the control parameters $C_{17}$ and $C_{18}$ is selected and carried out by the control selector $S_{13}$. And finally, in the control selector $S_{14}$, one of the control parameters $C_{19}$ and $C_{20}$ is selected and carried out.

In this manner, a concrete control method is determined by the control selectors $S_{11}$ through $S_{14}$, based on the operational status of the engine. In principle, the control parameters $C_{11}$ through $C_{n1}$ may be selected by the control selectors $S_{11}$ through $S_{n1}$ to eliminate a detected malfunction. In the same manner, the control measures to maintain the vehicle's operability may be selected by the control selectors $S_{12}$ through $S_{n2}$; the controls to prevent degradation of the engine's exhaust gas characteristics are then selected in the control selectors $S_{13}$ through $S_{n3}$; and the controls to regulate the engine's fuel consumption are selected in the control selectors $S_{14}$ through $S_{n4}$. The priorities of those control measures (parameters), from malfunction elimination ($S_{11}$ through $S_{n1}$) through engine fuel consumption control ($S_{14}$ through $S_{n4}$) are determined beforehand for each said diagnosis item, in the manner described in detail hereinafter.

The order of priority in which the various stages of the above control process (elimination of malfunction, assuring vehicle operability, etc) are addressed may be varied depending on the particular monitored item. For example, in the case of catalyst diagnosis, control measures to prevent degradation of the exhaust gas characteristics are given top priority. In the case of engine misfire control, on the other hand, malfunction correction or assuring vehicle operability is given priority. The priority of each control is determined taking into account the nature, and the operational and safety significance of the particular diagnosis item.

The differing priority requirements applicable to each of the various monitored items is the reason why all four of the above considerations are not taken into account simultaneously in order to carry out the controls. In a like manner the diagnosis of each of the monitored items represented by $D_1CTR$ through $D_nCTR$ in FIG. 1 must be prioritized as well, since some diagnosis control items depend on the diagnoses of other items. For example, for diagnosis of the catalyst, which is carried out according to the output signals from the $O_2$ sensors mounted both before and after the catalyst, the diagnosis of the $O_2$ sensors must be performed first. That is, the catalyst diagnosis is never carried out before it is confirmed that the $O_2$ sensors are normal. Of course, each control is carried out in consideration of the safety of the vehicle's operation. The following table is an example of a set of priorities which may be utilized according to one embodiment of the invention.

alternative control methods is selected depending on the current operational status of the engine. (In this embodiment, for the purpose of illustration, engine load is used to make this selection; another control parameter could also be used, however.) If the engine is idling, mode A is selected, and the target idling rpm speed Ne(set) is increased in step 104 by an amount necessary to prevent an engine stall, which might otherwise occur in some cases, thus maintaining safety or operability of the vehicle. In step 106, the ignition control circuit (ig-CTR) is checked for malfunctions (misfire is already detected), by determining if either the primary voltage or primary current of the ignition coil is above a required value when the switching transistor is turned on. If this diagnosis result is not abnormal (no malfunction is detected in the operation of the ignition control circuit), processing goes to step 110, in which the fuel supply stop (F/C) flag for the affected cylinder is set. In step 122, the target idling speed Ne(set) increment flag is set, for the processing in step 104.

If the result in the ignition control circuit check in step 106 is abnormal (that is, a malfunction is detected in the ignition control circuit), the processing goes to step 108, in which ignition (high discharging ignition) is repeated using a higher discharge voltage and/or a longer ignition period.

| 1. | MONITORING PRIORITY | | | | | | | | | | | |
|---|---|---|---|---|---|---|---|---|---|---|---|---|
| | Misfire | > | Oxygen Sensor | > | Fuel System | > | Evaporative System | > | Catalyst | > | EGR System | |
| a. | Exhaust Gas Emissions | | | | | | | | | | | |
| | Catalyst | > | Misfire | > | Secondary Air | > | EGR System | > | Oxygen Sensor | > | Fuel System | > | Evaporative System |
| b. | Drivability | | | | | | | | | | | |
| | Misfire | > | EGR System | > | Fuel System | > | Evaporative System | > | Oxygen Sensor | > | Secondary Air | > | Evaporative System |
| c. | Fuel Consumption | | | | | | | | | | | |
| | EGR System | > | Misfire | > | Oxygen Sensor | > | Fuel System | > | Evaporative System | > | Catalyst | > | Secondary Air |
| d. | Engine Management System | | | | | | | | | | | |
| | Evaporative System | > | Fuel System | > | Misfire | > | Secondary Air | > | Oxygen Sensor | > | EGR System | > | Catalyst |
| 2. | CONTROLLING PRIORITY | | | | | | | | | | | |
| | Recovering of of Malfunction | > | Keeping Drivability | > | Preventing Emission Worse | > | Preventing Fuel Consumption Worse | | | | | |

It is of course apparent that the above priorities may be varied to accommodate different systems and different operational requirements.

The detailed operation of the diagnostic and control system according to the invention will now be discussed, with particular reference to detection and correction of malfunctions in specific monitored items, starting first, with the diagnosis of engine misfires. Many methods have been developed for detecting misfiring, including for example, the use of ion current, an optical sensor for combustion status in the engine, the primary voltage on the ignition coil, etc. The control technique according to the present invention may be used when a misfire is sensed by any of those methods. (That is, any method will do, if it can sense the occurrence of misfire.)

Figure 4:
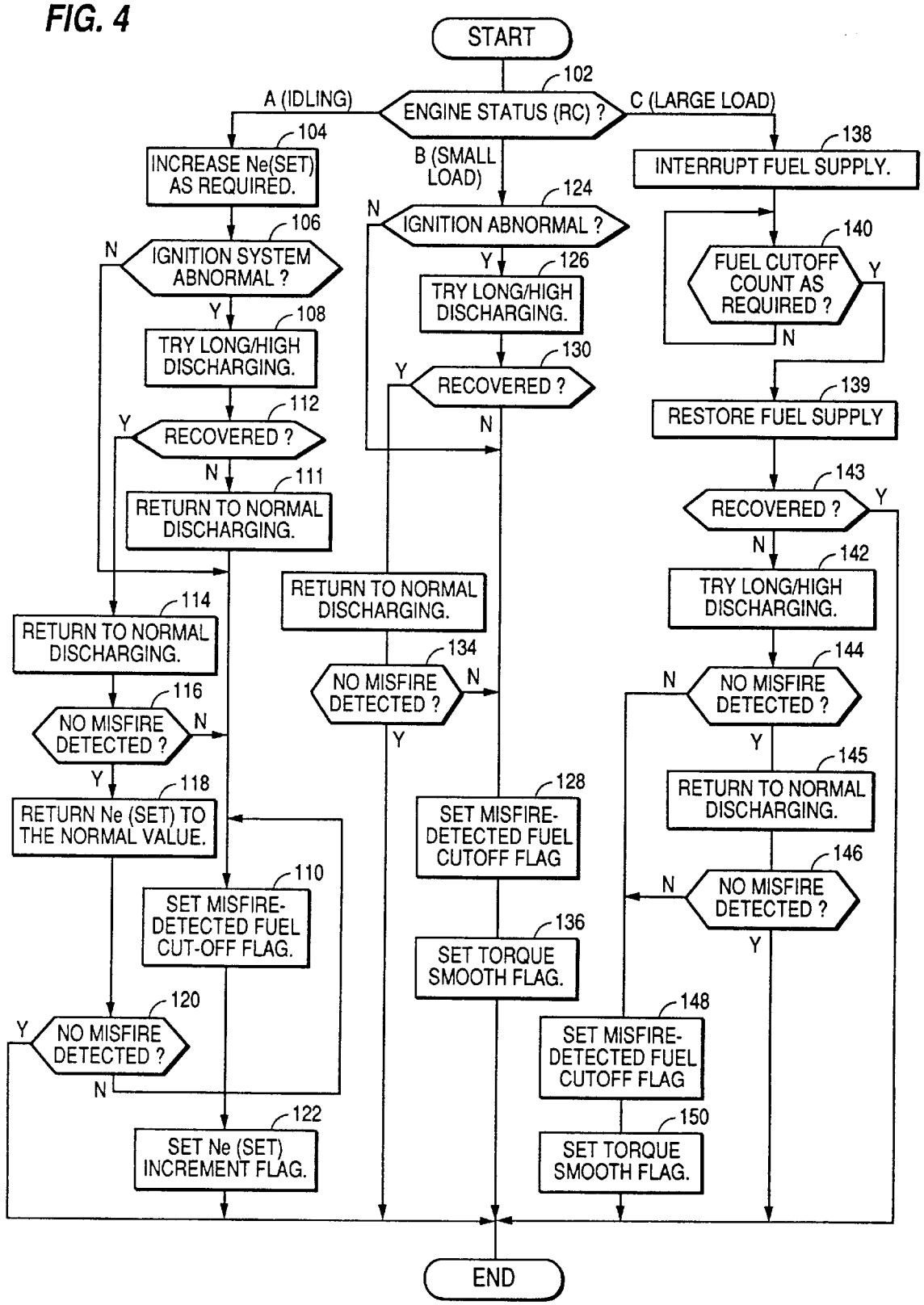
FIG. 4 is a flow chart which illustrates the operation of the misfire control arrangement of FIG. 3.

FIG. 4 shows a flow chart for implementing the diagnostic and control method according to the invention for the correction of misfires. The operation shown in this flow chart is started upon the detection of a misfire by any known method, as described above. In step 102, one of three The result is then checked in step 112. If proper ignition control circuit operation is not restored, then the voltage is returned to the normal discharge voltage (step 111). After this, processing in steps 110 and 122 are executed.

If proper operation is restored in step 112, the magnitude and duration of the discharge voltage are returned to normal ignition in step 114. Then, in step 116, if no misfire occurs on the normal ignition condition and normal ignition is restored, the processing goes to step 118, where the target idling speed Ne(set), increased in step 104, is returned to the initial value. When normal operation is confirmed in step 120, processing is terminated. If normal operation is not confirmed in step 120 (that is, if a misfire is detected), then steps 110 and 122 are executed, and processing is then terminated.

If a misfire is detected in step 102 when the engine is operating with a light load (for example, with a load of less than 50%), mode B is selected. In step 124, the ignition control circuit (ig-CTR) is checked for errors in the same manner as in step 106. If an abnormality is detected, the processing in step 126 is performed in the same manner as in step 108, and the result (whether or not the misfire is eliminated) is checked in step 130. If not, the fuel supply to the affected cylinder is stopped, and the fuel supply flag (F/C) is set in step 128 just as in step 110. In step 136, the decrease in torque caused by interruption of the fuel supply is smoothed, for example, by reducing the supply of fuel to other cylinders, especially those firing immediately before and after the one in which a misfire has been detected. In this manner the operability of the vehicle is maintained. Alternatively, torque smoothing can also be achieved, by retarding the ignition timing of the cylinders just before and after the one in which a fire has been detected.

On the other hand, if elimination of the misfiring malfunction is confirmed in step 130, the length or duration of the ignition discharge voltage set in step 126 is returned to the normal voltage ignition in step 132, and the ignition is again checked in step 134. If no misfire is detected, the operation is continued. If misfiring is detected, the fuel supply is stopped and torque smoothing is carried out in steps 128 and 136. Finally, if the ignition control circuit (ig-CTR) is judged abnormal in step 124, then the processing in steps 128 and 136 is executed.

In step 102, if a misfire is detected when the engine load is high (more than 50%), mode C is selected. In this case, the fuel supply to the affected cylinder is interrupted in step 138 for a period of time (until a predetermined specified count is reached in step 140). At that point the fuel supply is restored in step 139, and a check is made in step 143 whether or not the misfiring error is eliminated. If so, processing is terminated. If not, the recovery processing is executed in step 142 in the same manner as in steps 108 and 126, and a further check for a misfire is made in step 144. If no misfire is detected, the discharge voltage is returned to normal in step 145 (just as in steps 111, 114, and 132), after which a check is made for the occurrence a misfire with the normal discharge voltage in step 146. If no misfire is detected, the processing is terminated. If, however, a misfire is detected in step 144, even after the recovery processing (in step 142), then the fuel supply stop flag in mode C is set for the cylinder in which the firing malfunction is detected in step 148. In step 150, the torque smoothing flag is set, and processing ends.

If the target idling speed $N_e$(set) is returned to the normal value in step 118, this may be done in increments, and the ignition status checked in each step. In this case, the value can be set to that which existed just before the misfire occurred. In other words, since $N_E$ can be set to the level just before a misfire occurs, the frequency of the fuel supply interruption can be reduced. Returning to the normal discharge voltage can also be made in the same way. For example, in step 114, 132, or 145, the voltage can be returned incrementally to the optimized voltage which existed just before a misfire occurs.

Figure 3:
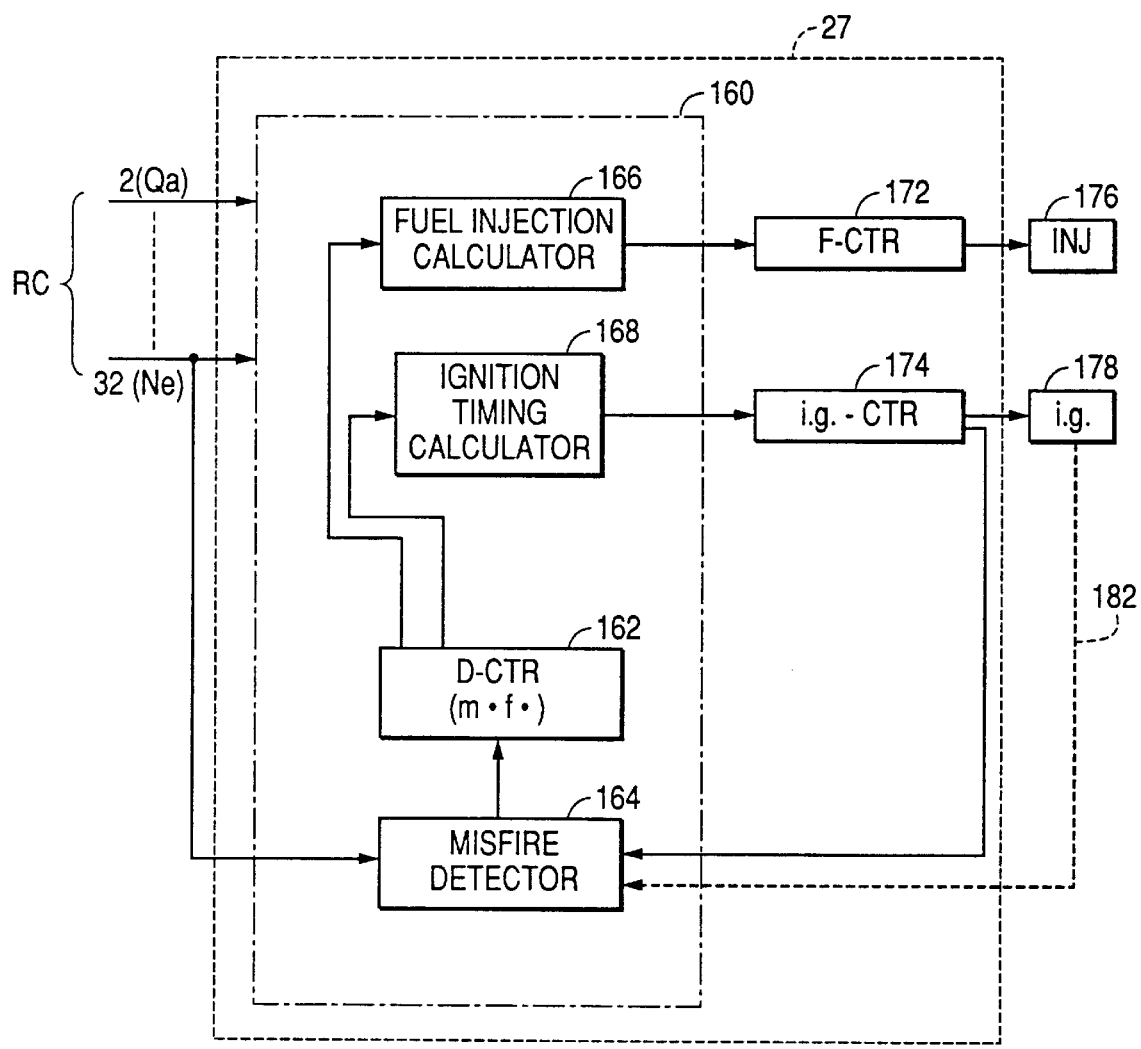
FIG. 3 is a block diagram of a misfire control arrangement according to the invention.

FIG. 3 is a block diagram which illustrates a structural arrangement suitable to implement the technique shown in FIG. 4. In this embodiment, the misfire control arrangement is included in the engine control unit 27 (See FIG. 2), which has a fuel injection calculator 166 and an ignition timing calculator 168. The output from the fuel injection calculator 166 is provided to the fuel control unit (F-CTR) 172 to control the injector (INJ) 176, while the output signal from the ignition timing calculator 168 is provided to the ignition control circuit (ig-CTR) to control the ignition coil (ig) 178. A sensor 164 detects the occurrence of a misfire by sensing the primary voltage signal 180 of the ignition coil 174 or the ion current signal 182, at the ignition plug, or by sensing the rpm variation of signal $N_e$ 32. The misfire diagnosis control unit (D-CTR m, f)), controls the fuel supply interruption (F/C) by means of the fuel injection value calculator 166, or controls the remedial measures to eliminate the misfire by controlling the ignition timing calculator 168, as shown in FIG. 4 at steps 138 et seq. In particular, it issues a processing command corresponding to the processing in step 108 (FIG. 4), which triggers the engine control unit 160, then the concrete control signal is output from the ENG-CTR. The input RC represents an operating status signal of the engine, with Qa being the intake air flow and Ne being the engine speed (rpm). In FIG. 3 a microcomputer is shared by the diagnosis control 162 and the engine control 160. This microcomputer may be mounted separately for each of those controls.

Figure 5:
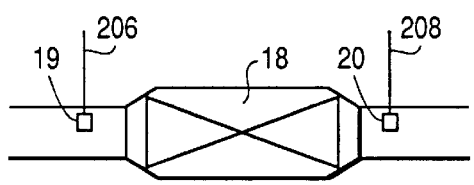
FIG. 5 shows the positioning of an exhaust catalyst in a vehicle exhaust system.

The arrangement for diagnosing the operating condition of the catalyst will be explained next. In this invention, $O_2$ sensors 19 and 20 are mounted in the vehicle exhaust line, upstream and downstream of the catalyst respectively, as shown in FIG. 5. The relationship between the output signals 206, 208 from these $O_2$ sensors 19, 20 is used to evaluate the condition of the catalyst 18, which of course is dependent upon normal operation of both the $O_2$ sensors. Thus, in order to assure a correct evaluation, the $O_2$ sensors 19 and 20 must be diagnosed before the catalyst is diagnosed. ($O_2$ sensor diagnosis will be explained later.)

The technique for diagnosis of the catalyst in this invention will be explained below with reference to the flow chart shown in FIG. 6. In step 210, a determination is made whether the operational status of the vehicle falls within a set of predetermined operating parameters which define a valid "testing range" (for example, engine speed 2000 to 3000 rpm, vehicle speed 60 to 90 km/hr, and intake air flow about 10% of the full load). If it is determined that the vehicle is not operating within such proper testing range, processing is terminated. If on the other hand, the vehicle is operating in the testing range, then a determination is made in step 214 whether the "lean flag" has previously been set. (See steps 228 and 246). If not, the output signals from the two $O_2$ sensors 19 and 20 are used to diagnose the catalyst in step 212 to determine whether an abnormality exists. If no abnormality is detected (N), the processing is terminated. If, however, the result is abnormal (Y), the air flow (Qa) is checked in step 216. (It should be noted in this regard that any method of diagnosing catalyst abnormalities may be used for the purpose of FIG. 6, up to step 212).

In step 216, the volume of intake air flow (or exhaust gas temperature) is compared with predetermined values. If it is in a low range, mode A is selected, and the processing in step 218 is executed to shorten the air-fuel ratio feedback control cycle so that it may be closer to the theoretical air-fuel ratio, and processing is then terminated.

If a medium air flow (Qa) (or exhaust gas temperature) is detected according to the predetermined values in step 216, normal canister purging is stopped in step 220 and the ignition timing is retarded in step 222. In step 224, a determination is made whether the catalyst abnormality has been corrected. If so, canister purging is restarted in 226, the retarded ignition timing is returned to normal in step 232, and processing is ended. If the catalyst abnormality is not remedied (as determined in step 224), a check is made in step 225 whether the retarded ignition timing has reached a preset limit. If not, step 222 is repeated, so that the ignition timing is further retarded, and the recovery status is checked once again in step 224. If after several iterations of retarding in step 222 the ignition timing reaches the preset limit without having corrected the catalyst abnormality as determined in step 224, then the "lean" flag is set in step 228 and the ignition timing control is returned to the normal spark advance control in step 232.

In step 214, if it is determined that the lean flag has been set, the fuel mixture is adjusted incrementally to make it leaner, in step 240. In this case, the catalyst temperature must be watched carefully so that it does not rise excessively. (Preferably, it is cooled with the secondary air.) In step 242, a check is made to determine whether the catalyst abnormality has been eliminated. (The fact that the lean flag has been set, it should be noted, indicates that an abnormal condition has in fact been detected previously). If the catalyst abnormality has not been eliminated, processing is terminated. If the abnormality has been eliminated, leaning (step 240) is stopped, the lean flag is set in step 246 and processing is terminated.

As can be seen from the foregoing, this invention assumes that a catalyst error is caused by low engine operating temperature, and accordingly the air-fuel mixture ratio is adjusted to make it leaner so that the temperature rises, and the result is then checked. In step 216, therefore, as an alternative measure, the determination may be based on whether the exhaust gas temperature is in a preset low or middle temperature range, in which case air flow is not used.

Figure 6:
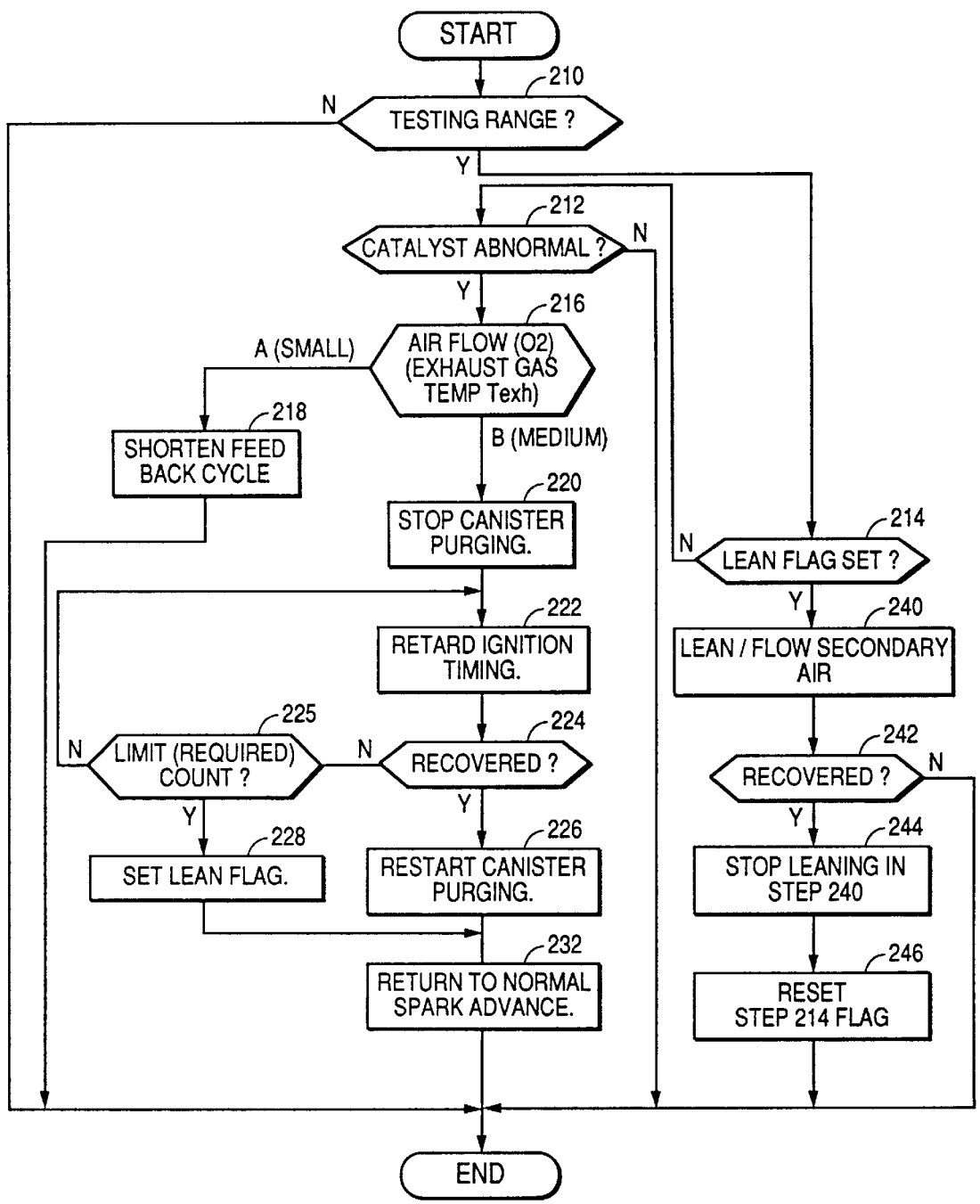
FIG. 6 is a catalyst error control flow chart.
Figure 7:
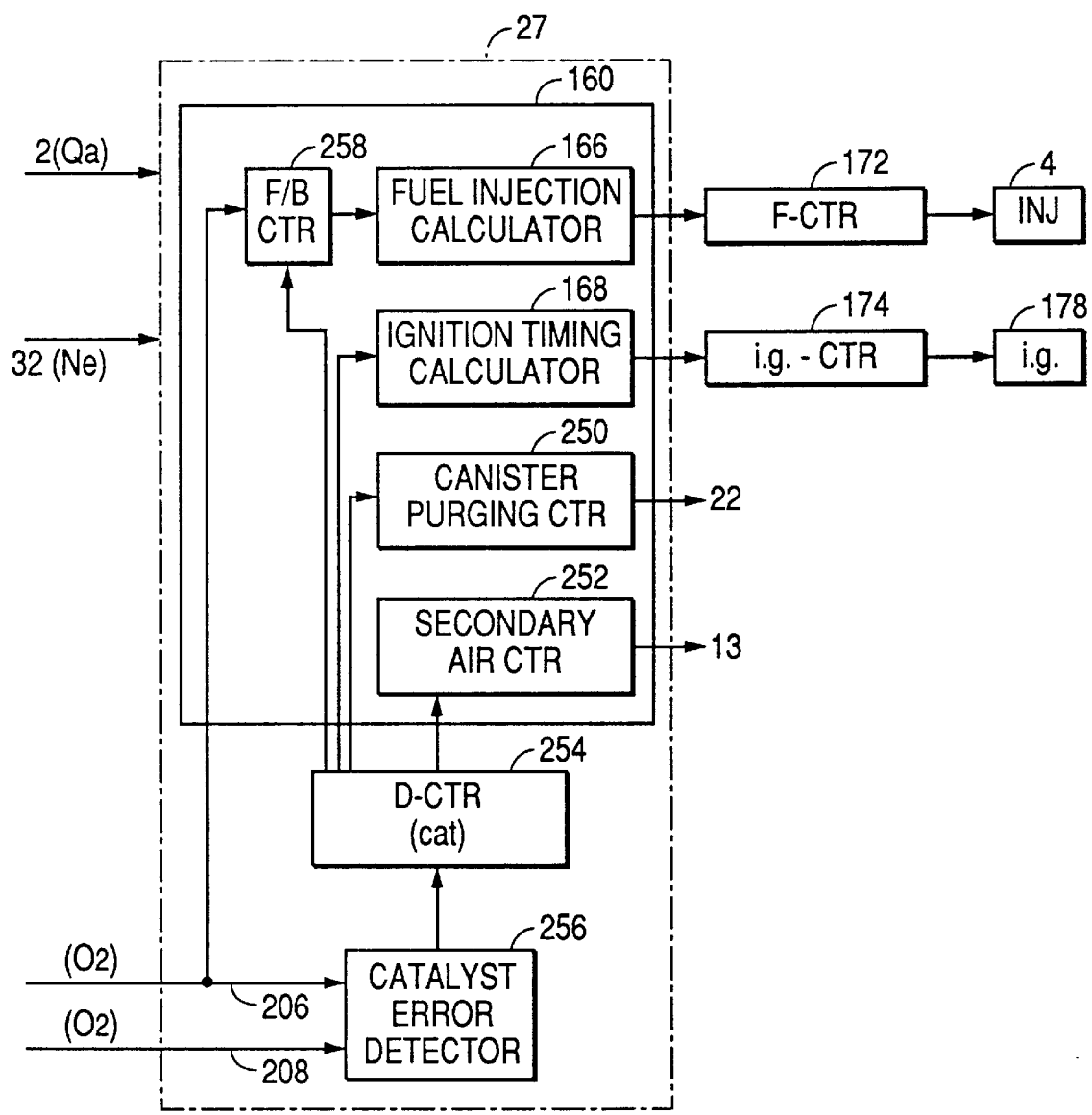
FIG. 7 shows a catalyst error control block diagram.

FIG. 7 (which uses the same symbols as FIG. 3 for elements common to both) shows a block diagram of an arrangement for performing the diagnostic technique of FIG. 6. The catalyst diagnosis unit 256 uses the signals 206 and 208 from the $O_2$ sensors 19 and 20 for catalyst diagnosis. If a catalyst error is detected, the catalyst diagnosis control unit (D-CTR) 254 executes the processing shown in FIG. 6, and sends appropriate control signals to the engine control unit 160. That is, the ignition timing is retarded in step 222 (FIG. 6) by the ignition timing control calculator 168 interrupting canister purging. For processing related to the canister, in which canister purging is stopped (FIG. 6, step 220), or to correct an abnormality, the canister purging control 250 is activated (FIG. 6, step 226); and in case of the secondary air flow control, the secondary air control 252 is activated. Finally, when the cycle of the air-fuel mixture feedback control (F/B) is to be changed, the feedback control shortens the control cycle so as to minimize changes of the air-fuel mixture.

Figure 8:
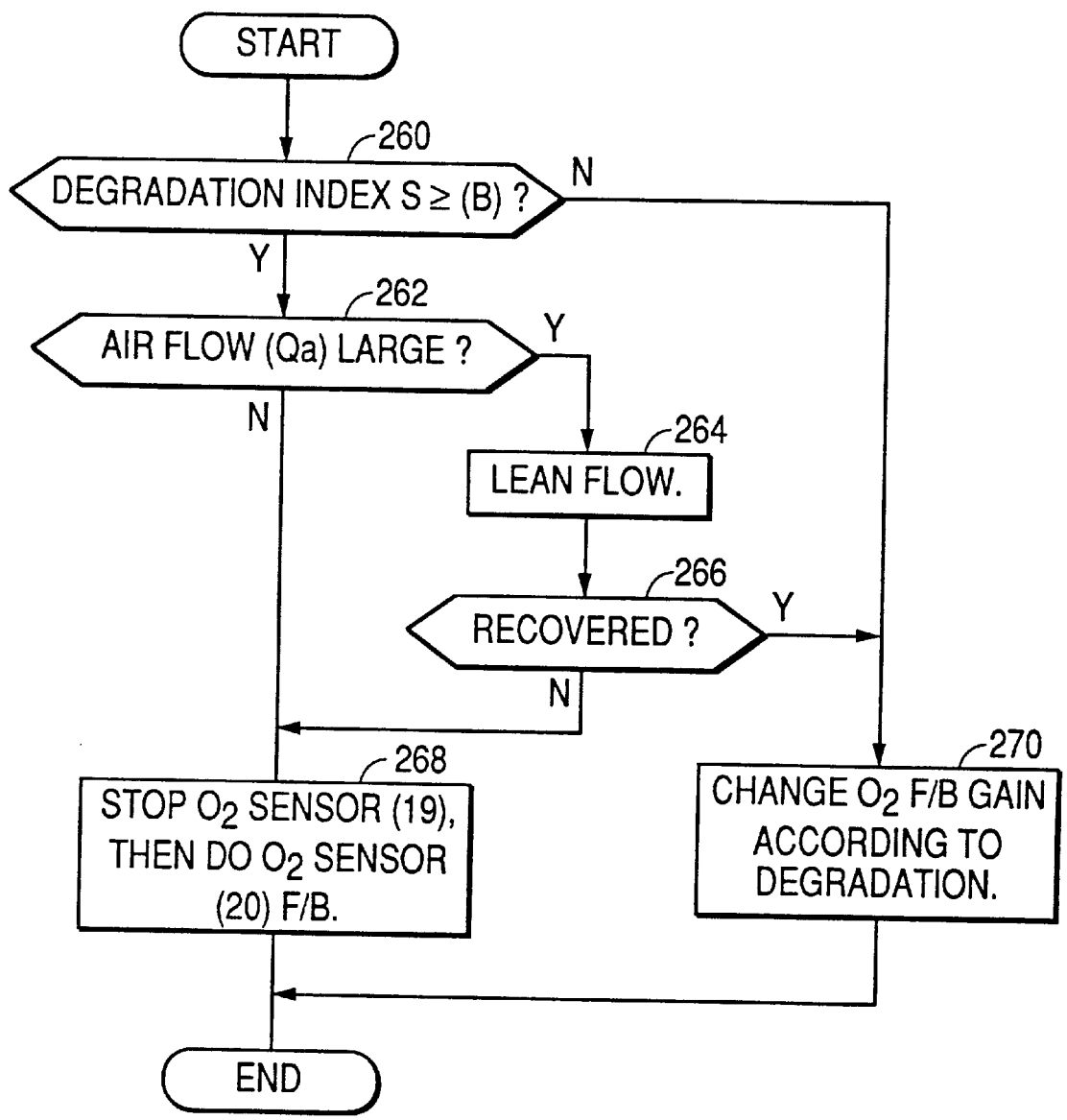
FIG. 8 is an upstream $O_2$ sensor error control flow chart.

FIG. 8 is a flow chart which shows the diagnosis and control procedure for the $O_2$ sensor 19. (A comparable procedure may be applied to sensor 20, as noted below.) In a first step 260, it is determined whether a "degradation index "S" for the sensor has exceeded a predetermined threshold value. In order to understand this technique, it is thus necessary first to understand the derivation of the degradation index S, which is discussed below.

Figure 9:
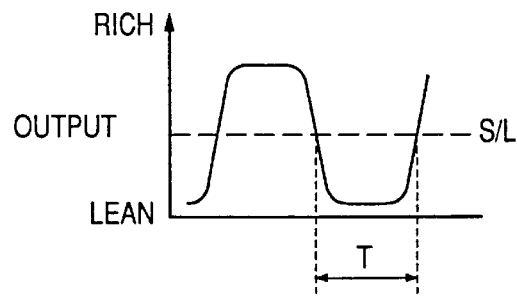
FIG. 9 is a graphic depiction of an upstream $O_2$ sensor signal.

FIG. 9 shows that the output signal from the $O_2$ sensor varies over time in response to feedback adjustments of the engine's air-fuel mixture. That is, whenever the output signal from the $O_2$ sensor falls outside predetermined threshold values, a feedback signal to the fuel supply system adjusts the air-fuel mixture, making it leaner or richer as appropriate, which in turn changes the composition of the engine exhaust gases, causing the output signal from the $O_2$ sensor to change in response thereto. It is apparent, that such a feedback system thus causes a cyclical variation in both the air-fuel mixture and the $O_2$ sensor output signal, and that the period of such variations is a function of both the gain of the feedback signal and the sensitivity of the $O_2$ sensor. As the $O_2$ sensor becomes degraded, the period of the cyclical variations in its output signal becomes longer. Hence, the length of such period may be regarded as a measure of such degradation, and may be used to derive the degradation index S.

Figure 10A:
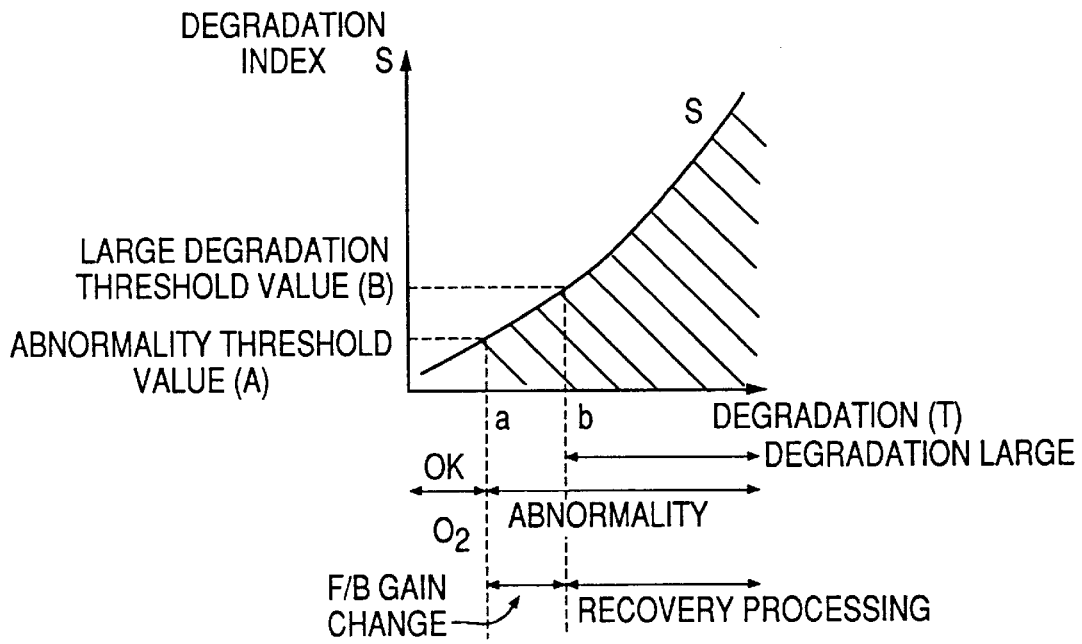
FIG. 10(A) is a graphic depiction of an upstream $O_2$ sensor degradation index.

As shown in FIG. 9, the cycle T is defined as the period of time between points at which the $O_2$ output signal crosses its own mid point, represented by the dashed line A. When T is large, it is concluded that the $O_2$ sensor is heavily degraded, as illustrated in FIG. 10(A). The cycle T is shown on the horizontal axis and the degradation index S on the vertical axis. If T is less than the first threshold value a, the $O_2$ sensor is judged to be normal. If T is greater than a, but less than a second (higher) threshold value b, the $O_2$ sensor is judged abnormal, but remediable by changing the fuel ratio feedback gain. Finally, if T is greater than b, the degradation is considered too great to be remedied by changing the feedback gain. Hence, another corrective measure will be needed.

Figure 11:
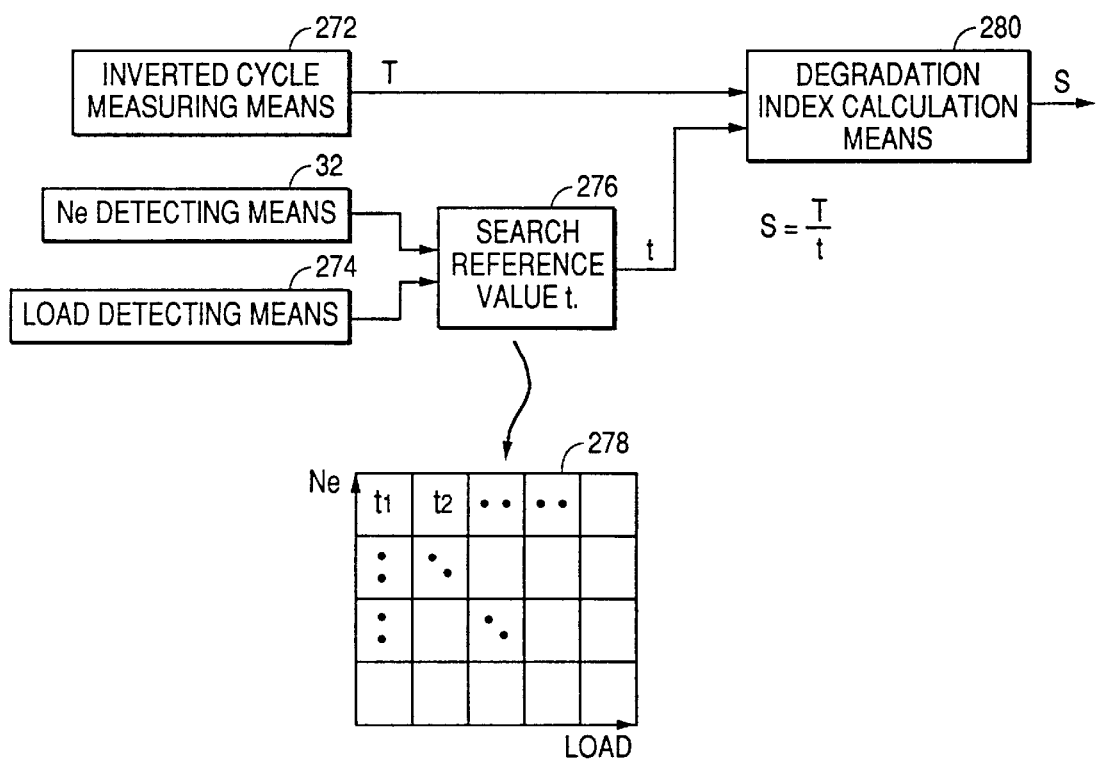
FIG. 11 is a block diagram which shows an arrangement for degradation index calculation.

FIG. 11 shows the manner of calculation of the degradation index S. The measuring means 272 detects the cycle of the inverted $O_2$ sensor output signal, while processor unit 276 receives signals from the engine speed detecting means 32 and the load detecting means 274. The processor unit 276 reads the reference cycle t determined by those two signals from the look up table 278, and the degradation index S is then calculated by the calculating means 280 (as S=T/t).

Figure 10B:
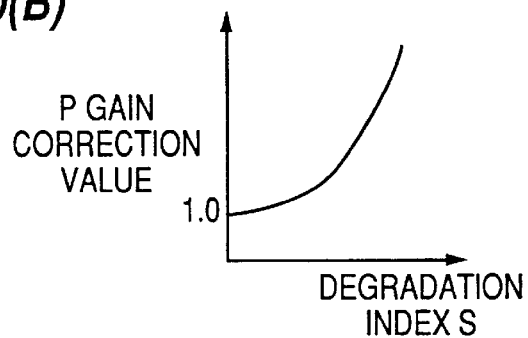
FIG. 10(B) is a graphic depiction of a degradation index and P gain correction.
Figure 10C:
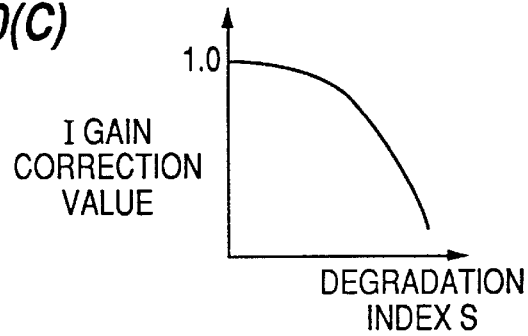
FIG. 10(C) is a graphic depiction of a degradation index and I gain correction.

Referring once again to FIG. 8, when it is determined in step 260 that the degradation index S is less than b (see FIG. 10(A)), the feedback gain is adjusted accordingly in step 270, and processing is terminated. (The feedback characteristics are shown as a function of S in FIGS. 10(B) and (C); as S increases, the proportional gain P increases while the integration gain I decreases. See FIG. 14.) If S is greater than b in step 260, the degradation is worse as shown clearly in FIG. 10(A), and as noted previously, cannot be remedied simply by adjusting the feedback gain. In this case, the intake air flow (Qa) is compared with a preset value in step 262 to determine whether the deficiency can be remedied by reducing the air flow to make the air-fuel mixture leaner. If the air flow is small, it is judged unrecoverable and the feedback control by the upstream $O_2$ sensor is used to control the feedback instead.

If the air flow is large in step 262, the air flow is adjusted in step 264 to make the air-fuel mixture leaner, within a range which will not damage the catalyst 200. It is then determined whether the error is eliminated in step 266. If so, the gain is changed in step 270, and processing is terminated. If not, however, step 268 is executed, and the processing is then terminated.

Figure 12:
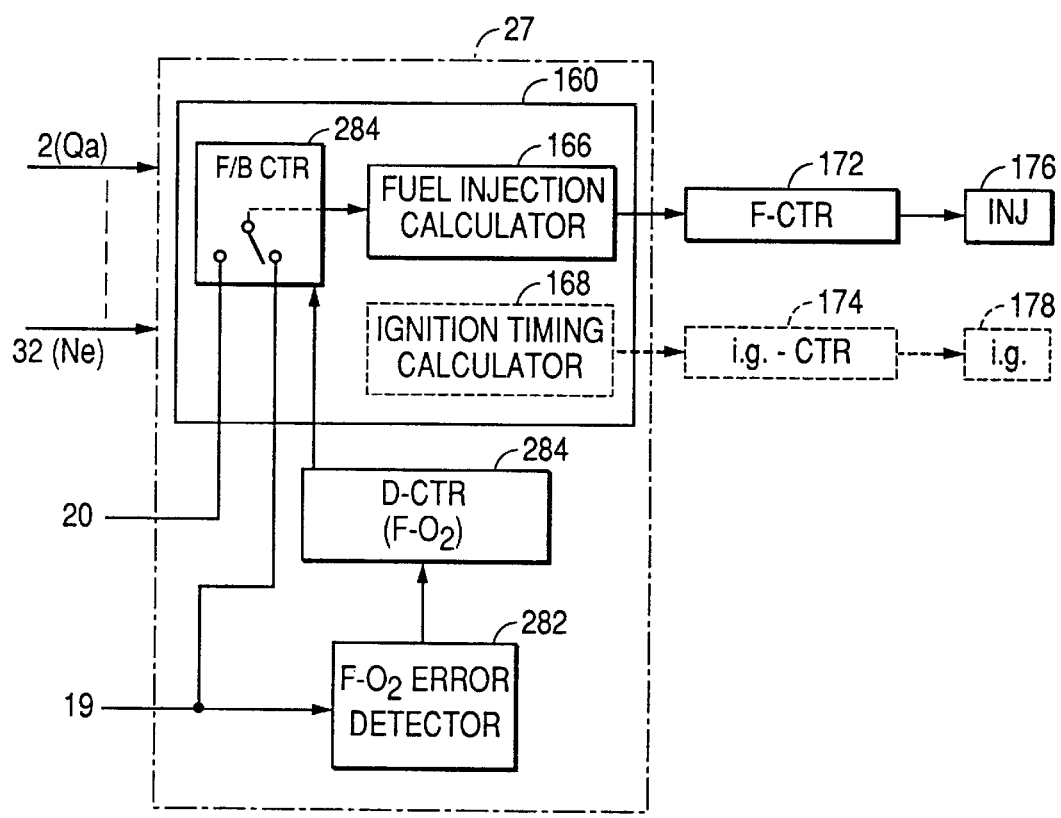
FIG. 12 shows an upstream $O_2$ sensor error control block diagram.

FIG. 12 is a block diagram of an arrangement for performing the $O_2$ sensor diagnosis and control method shown in FIG. 8. If a malfunction is detected by the diagnosis unit 282, then the diagnosis control (D-CTR/F-$O_2$) is activated, and sends a control signal to the engine control unit 160. If the degradation index S is less than (b) in step 260 (FIG. 8), the control signal is sent to the feedback control means (F/B CTR) 284 to change the gain as required. The signal from the diagnosis means 284 is also used to change the $O_2$ sensor from 19 to 20 in step 268 (FIG. 8).

Figure 13:
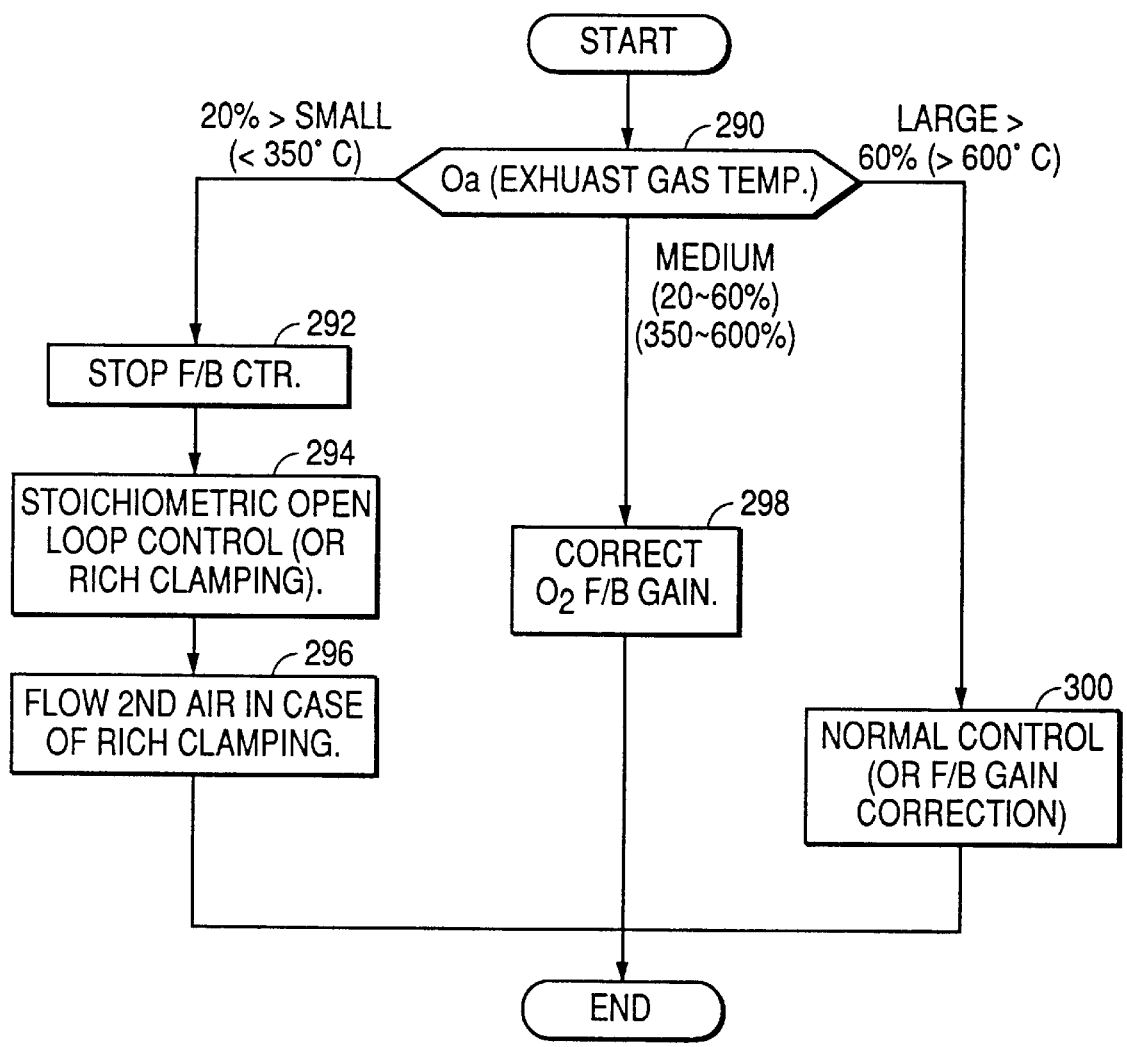
FIG. 13 is a flow chart which illustrates the upstream $O_2$ sensor heater error control.

FIG. 13 is a flow chart which shows the process for diagnosis and control of the $O_2$ sensor heater and FIG. 14 shows the air-fuel correction value utilized to control the air-fuel ratio in response to the feedback control signal. (I-gain refers to the slope of the A/F correction value, while P gain refers to the magnitude of the step increase indicated in the figure.)

Abnormalities in the heater are usually caused by a short or open circuit in the heater current circuit. Thus, heater current is generally used to diagnose the heater. When it falls outside certain preset values, the heater is judged to be abnormal, and a control measure is selected in step 290 based on the intake air flow (Qa) value at that time. When Qa is small (for example, when the load is less than 20% of the full load), air-fuel mixture feedback (closed loop) control is stopped in step 292, and open loop control is initiated in step 294 using a look up table which is accessed based on engine speed and load to adjust the fuel mixture to the stoichiometric point or to the rich side, in a conventional manner, causing a flow of secondary air in step 296 (rich side clamping only).

Figure 14A:
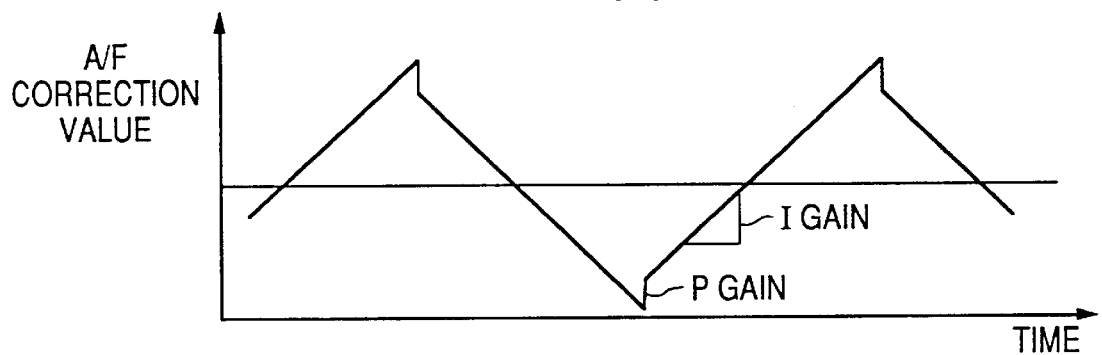
FIGS. 14(A) and 14(B) are graphic depictions of signal changes for upstream $O_2$ sensor heater errors.
Figure 14B:
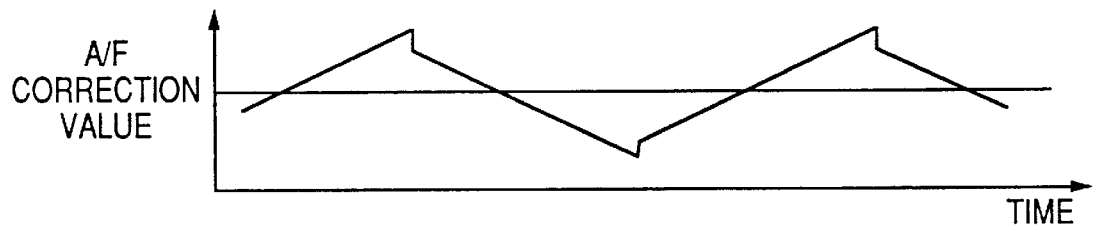

If the suction air flow Qa is in the middle range in step 290 (that is, when the load is 20 to 60% of the full load), the air-fuel ratio feedback gain is adjusted in step 298. That is, as shown in FIG. 14(A), the gain is excessive when the heater is abnormal, and as a result the amplitude of deviations of the air-fuel correction value from the target value become large. This excessive gain is corrected to minimize the amplitude of deviations from the target value as shown in FIG. 14(B).

Figure 15A:
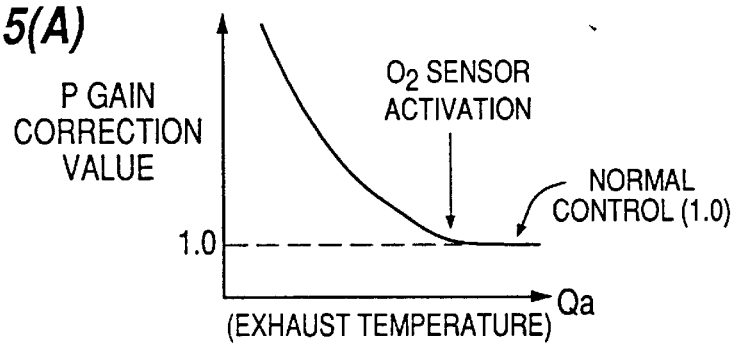
FIG. 15(A) is a graphic depiction of P gain correction in FIG. 13.
Figure 15B:
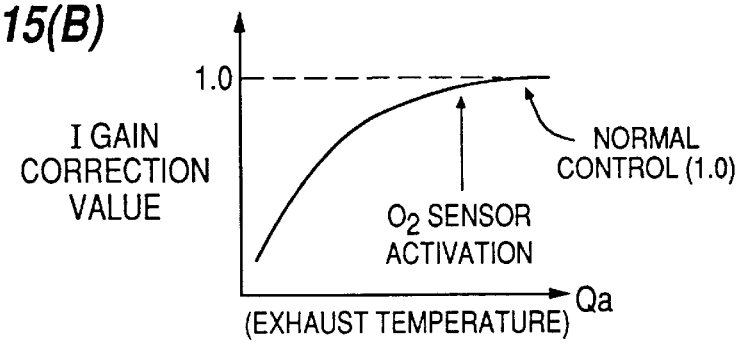
FIG. 15(B) is a graphic depiction of gain correction in FIG. 13.

If the suction air flow is judged large in step 290 (for example, when the load is more than 60% of the full load), then the normal control or gain correction control is implemented in step 300. As shown in FIG. 15, in both steps 298 and 300 control is performed in a conventional manner, such that the P gain (Proportional) becomes small when the suction air flow is large, and the I gain increases to a desired value when the intake air flow is large.

It should be noted that the exhaust gas temperature may be used in step 290 in place of intake air flow as the criterion for the control selection. Small suction air flow corresponds to an exhaust gas temperature of less than 350° C.; middle air flow to 350° C. to 600° C.; and large air flow to more than 600° C. respectively.

Figure 16:
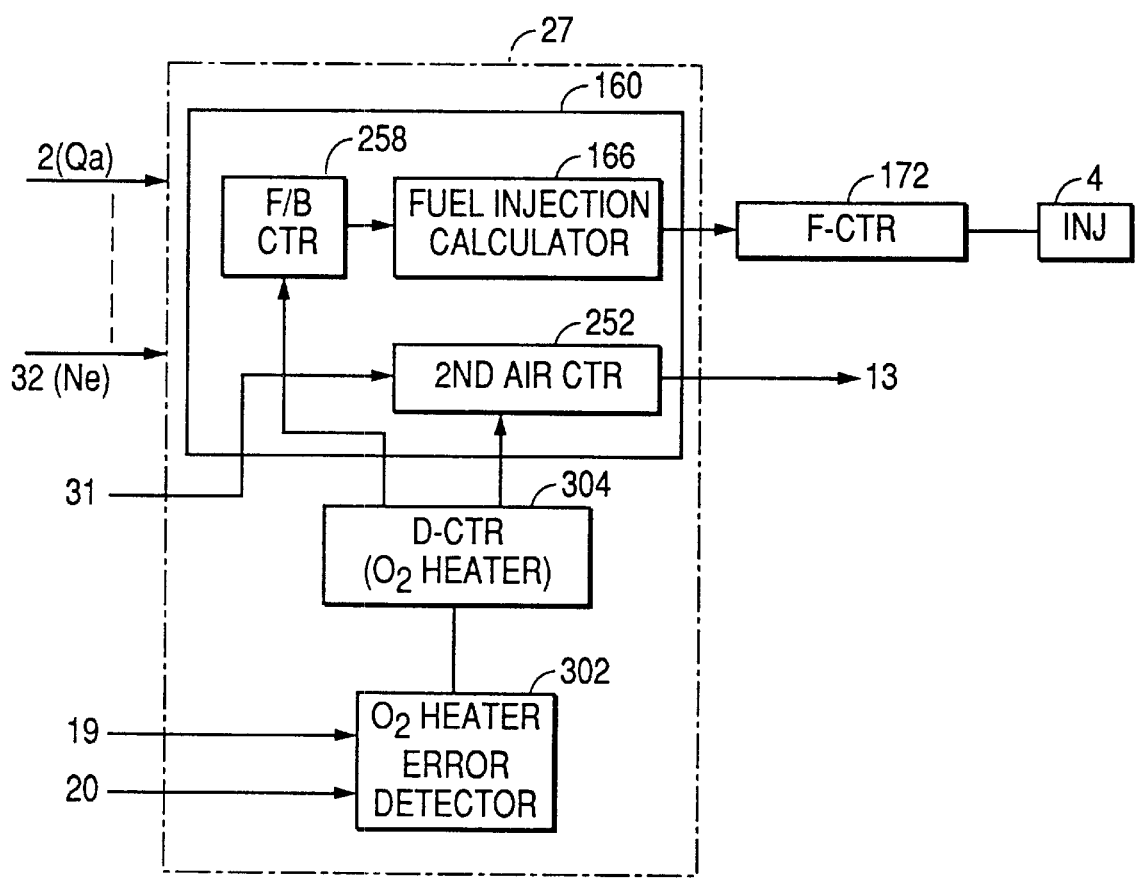
FIG. 16 is a block diagram of an upstream $O_2$ sensor heater error control arrangement.

FIG. 16 shows a block diagram of an arrangement for heater diagnosis control as shown in FIG. 13. As noted above, the heater current value is used to detect heater abnormalities in detector unit 302. If an error is detected, the diagnosis control unit (D-CTR, $O_2$ heater) 304 sends a control signal to the engine control unit 160 based on the engine operation status. For example, when the feedback control is stopped, or gain is corrected, in step 292, 298, or 300, the diagnosis control unit sends a control signal to the air-fuel mixture feedback control unit 258 to control the feedback. For processing in step 296, the control signal is sent to the secondary air control unit 252 to control the secondary air flow.

Figure 17:
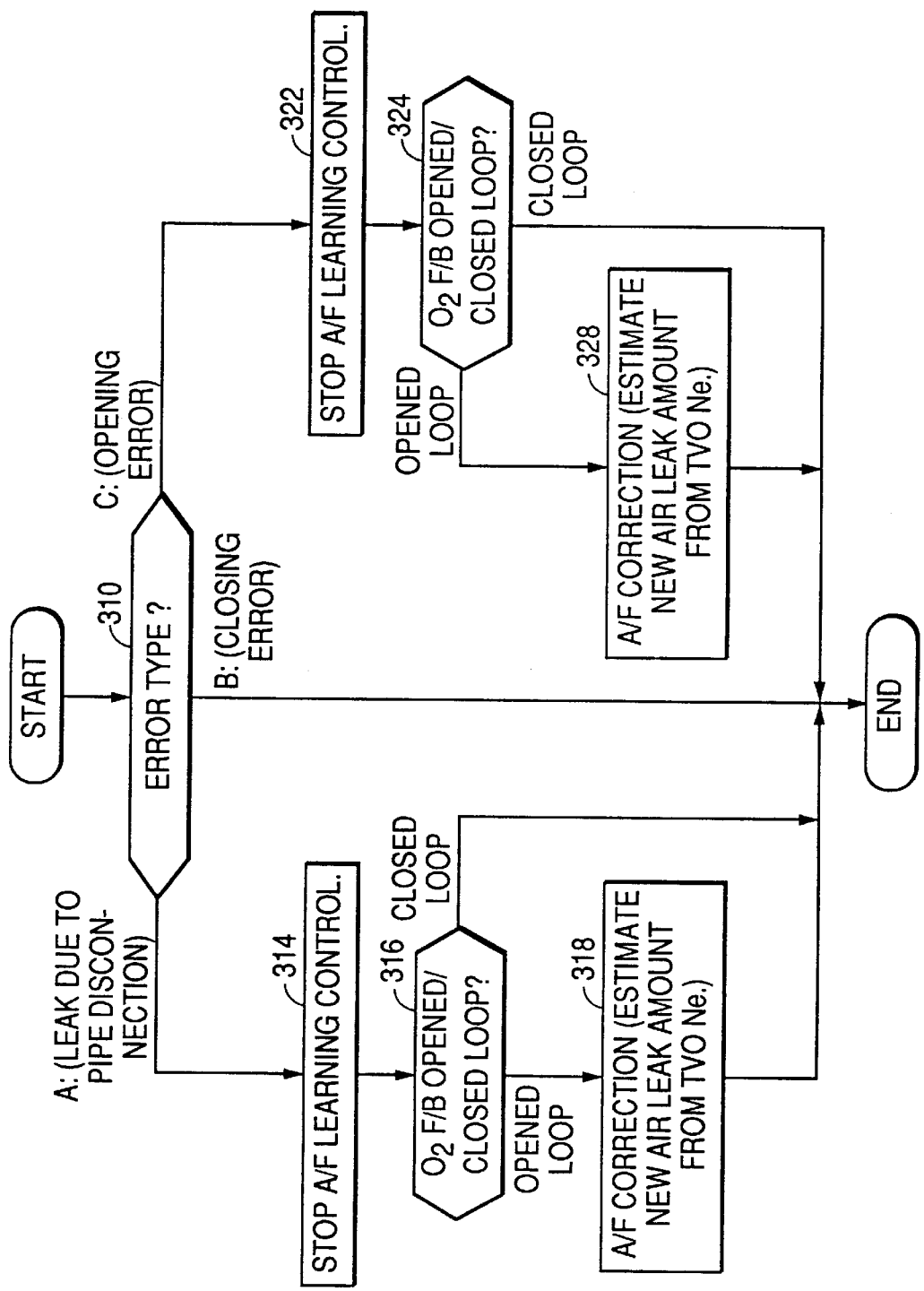
FIG. 17 is a flow chart which illustrates evaporator error control.
Figure 18:
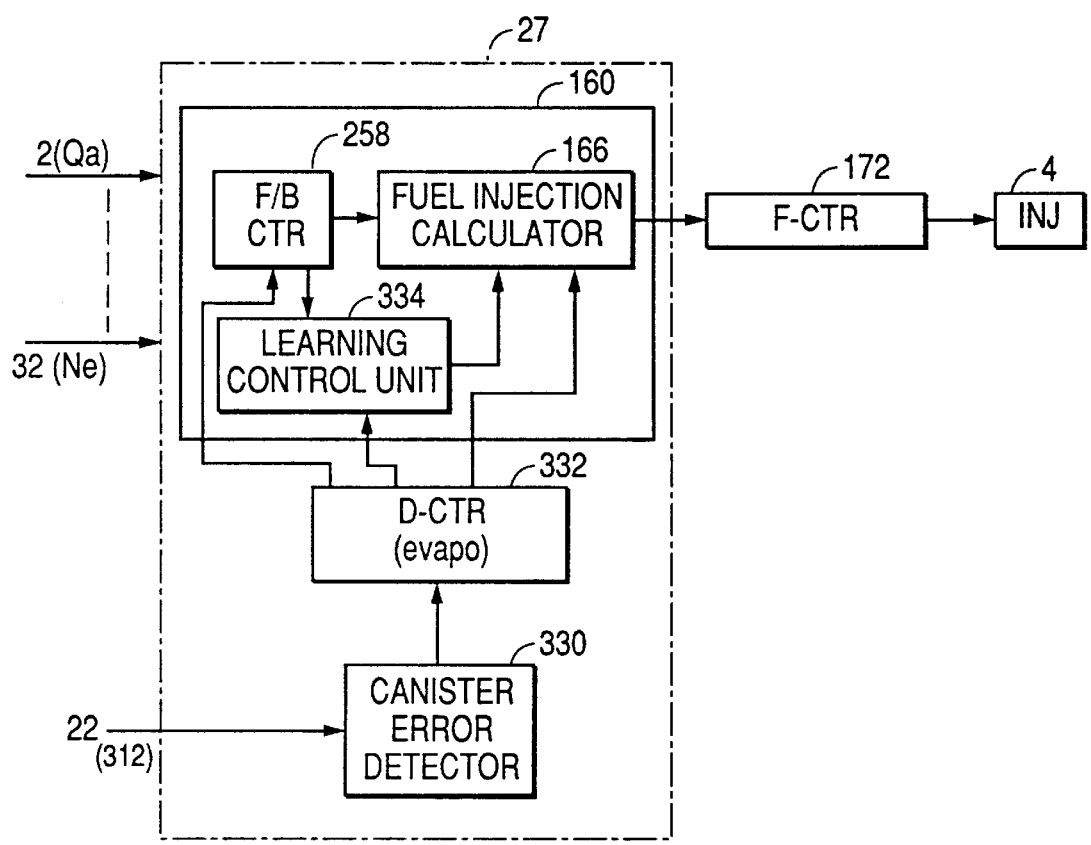
FIG. 18 is an evaporator error control block diagram.

FIGS. 17 and 18 show a flow chart and a block diagram, respectively, for diagnosis and control of the canister. When an abnormality is detected in the canister, the type of abnormality is determined in step 310. If it is judged to be a large leak, such as for example a canister pipe disconnection from the purging valve (FIGS. 17 and 18), then mode A (FIG. 17) is selected. In step 314, learning adjustment of the air-fuel mixture control is stopped immediately, and a determination is made whether the air-fuel mixture control is closed loop control or open loop control in step 316. (See FIG. 13.) In case of open loop control, the size of the air leak is estimated from the air flow Qa, the measured pressure of the intake manifold and the engine speed (Ne), and the air-fuel mixture is then corrected in step 318 based on the estimated value, using the look up table referred to in FIG. 13, step 294. On the other hand, for closed loop control (step 316), no further adjustment is necessary, and processing is terminated.

If the error is determined in step 310 to be caused by the complete closing of canister purging valve 22, then no processing is executed. Finally, if the error is judged to be caused by the complete opening of evaporator valve 22, then the same processings as those in steps 314 and 316 are executed in step 322 and 324. If closed loop control is assumed in step 324, processing is terminated.

In case of an evaporator error in an open loop control, the amount of air necessary to correct the air-fuel ratio is estimated. In closed loop control, the feedback gain, or learning adjustment, of the fuel air mixture is corrected according to the throttle opening and the engine speed. FIG. 18 shows a block diagram of an arrangement for the evaporator diagnosis and control technique of FIG. 17. When an error is detected in the evaporator error detector 330, the diagnosis control unit 332 sends a control signal to the engine control 160 in steps 318, 320, 328, or 326, depending on the error type and the type of control (open loop control or closed loop control). For example, when the air-fuel mixture learning control is stopped in step 314 or 322, the control signal is sent to the learning control unit 334 to stop learning control. This is also the same for correction of the feedback gain, and the like.

Figure 19:
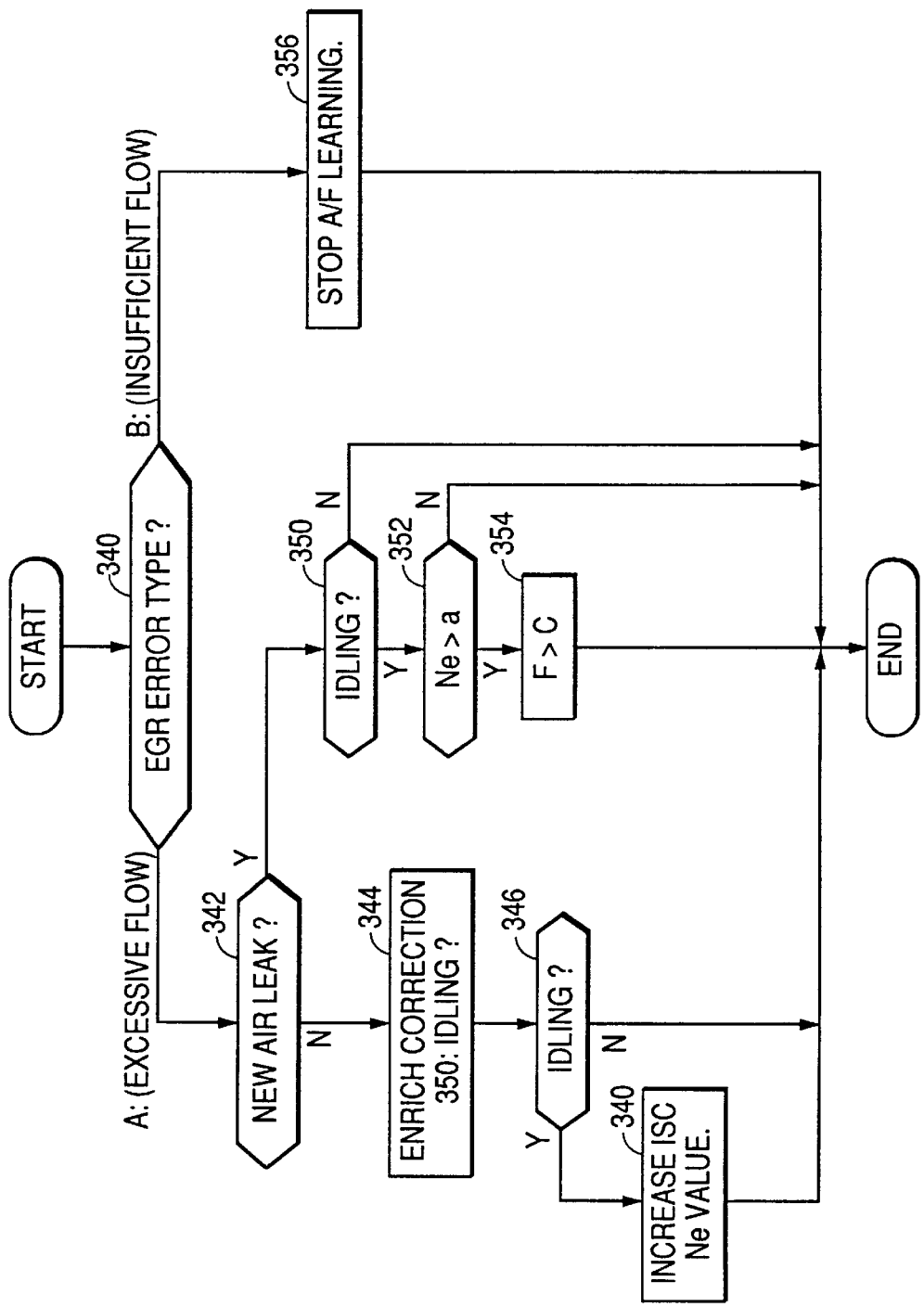
FIG. 19 is a flow chart which shows exhaust gas recirculation (EGR) system error control.
Figure 20:
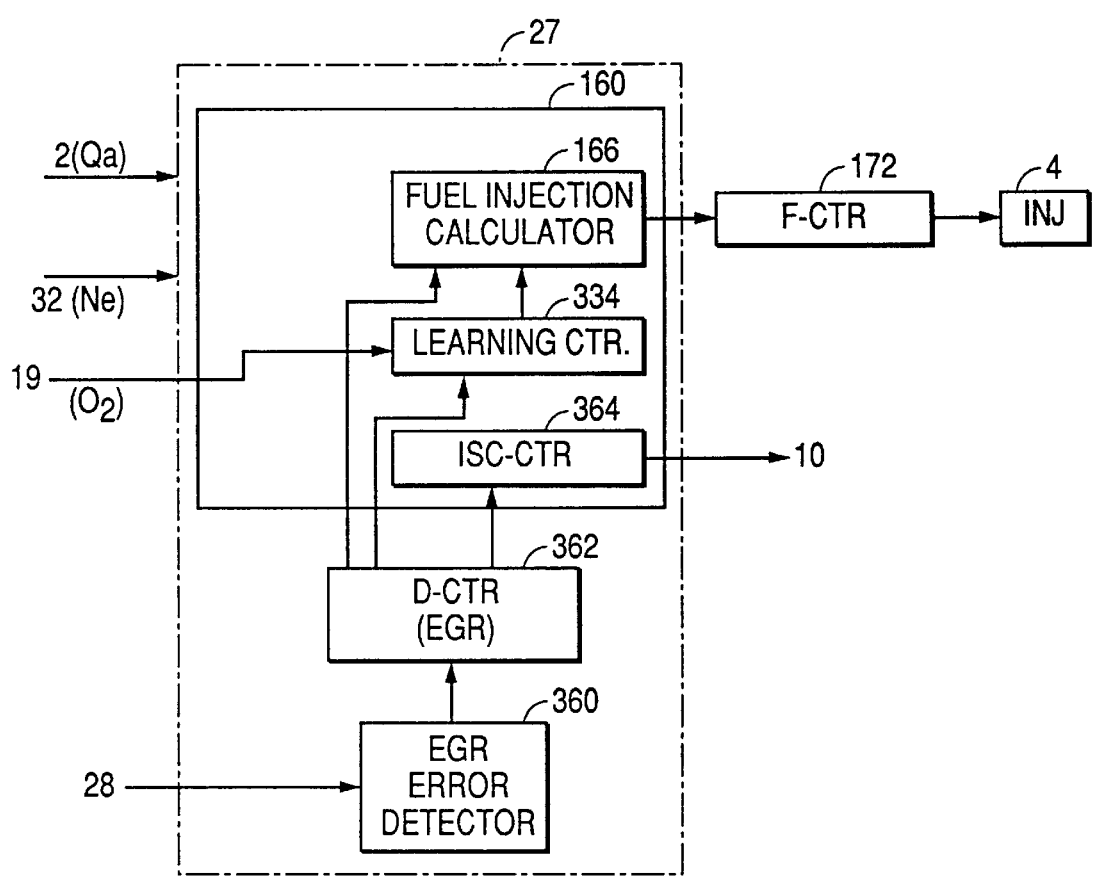
FIG. 20 is an EGR system error control block diagram.

FIGS. 19 and 20 show a flow chart and a block diagram respectively of an arrangement for EGR valve error diagnosis and control. Various methods can be used for EGR valve error diagnosis. For example, the arrangement in FIG. 2 utilizes one such method in which the pressure change of the intake air pressure sensor 28 (or, when the EGR control valve 8 is opened fully or closed fully, the output change of the intake air pressure sensor 28), is checked for diagnosis. If an error is detected in the EGR control valve, then the error type is determined in step 340. If the EGR return flow is excessive, in particular if the output change of the pressure sensor 28 is small, mode A (for excessive return flow) is selected. At this time, a check is made for a new air leak in step 342. If a leak is detected, then a determination is made in step 350 whether the engine is idling. If not, processing is terminated. If it is, a further determination is made in step 352 whether the engine speed Ne is larger than a preset value a. If so, the fuel supply (F/C) is stopped in step 354. On the other hand, if the engine speed does not exceed the threshold, processing is terminated.

If no leak is detected in step 342, an enrich correction is made in step 344, and a determination is made whether the engine is idling in step 346. If it is not, processing is terminated. If the engine is idling in step 346, however, the idling speed is increased in step 348. In other words, the speed is increased according to the EGR value. If insufficient return flow is detected in step 340, mode B is selected. At this time, the air-fuel mixture learning control is stopped in step 356. If there is a learning look up table for EGR errors, the look up table may be used. In general, however, learning control is stopped.

FIG. 20 shows a block diagram for EGR diagnosis and control according to the method in FIG. 19. When an error is detected in the EGR error detector 360, it sends a signal to diagnosis control unit (D-CTR, EGR) 362, which in turn sends a control signal to the engine control unit 160. For example, this control signal is sent to the learning CTR 334 to stop the learning control in step 356. If the engine is idling in step 346, the control signal is sent to the ISC-CTR 364 to increase the idling speed in step 348.

Figure 21:
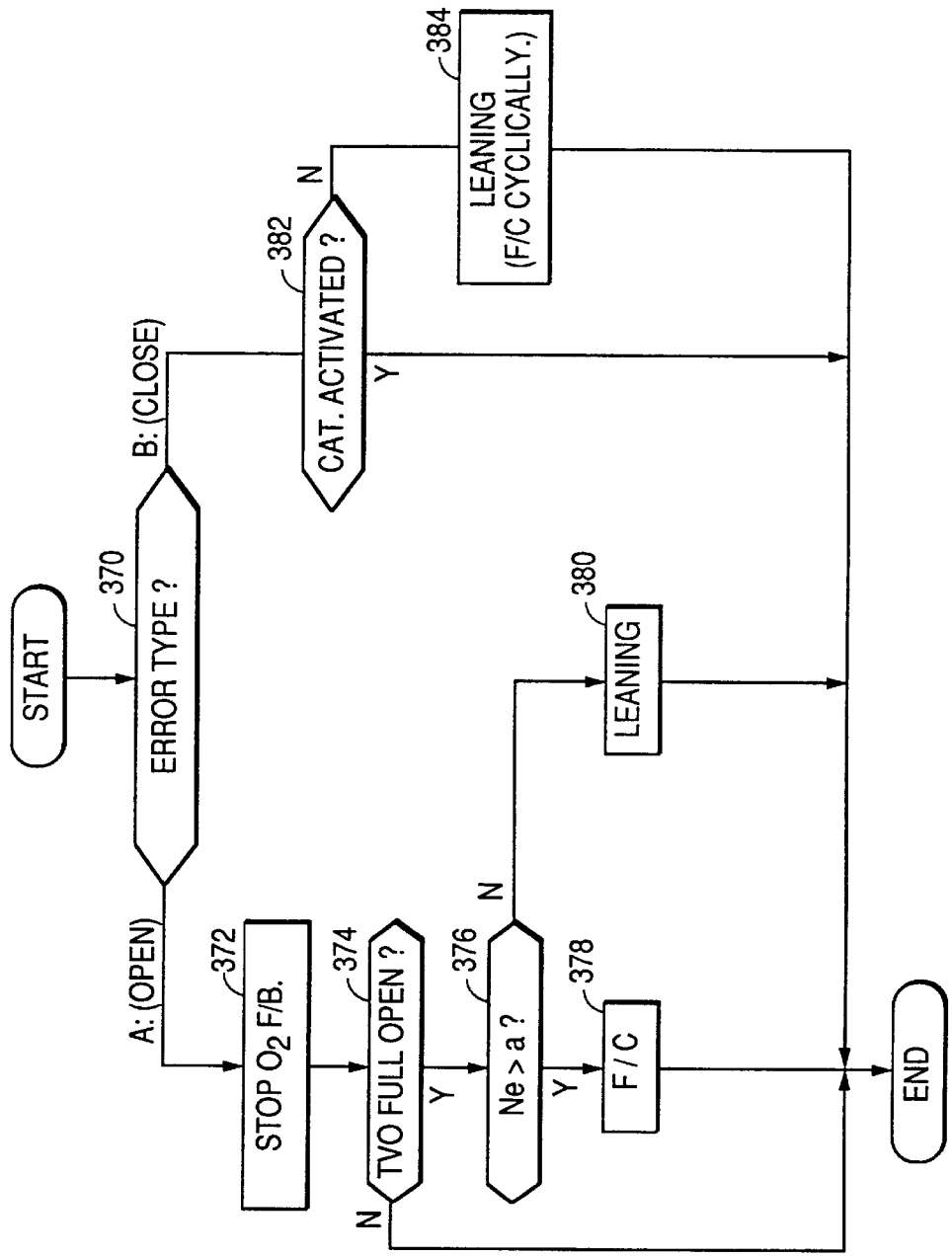
FIG. 21 is a flow chart which shows secondary air system error control.
Figure 22:
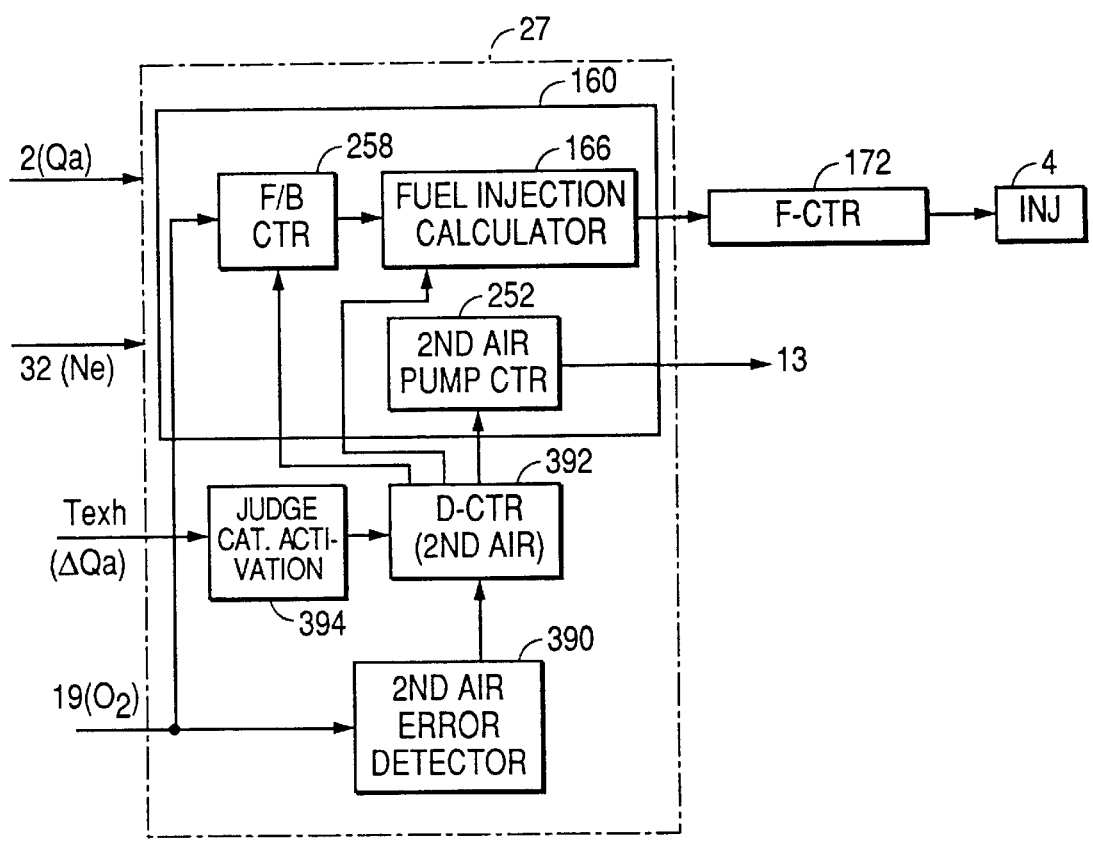
FIG. 22 is a secondary air system error control block diagram.

FIGS. 21 and 22 explain the secondary air system error diagnosis control. FIG. 21 is a flow chart for diagnosis and control of the air shut-off valve 14 (FIG. 2), and the like, including the secondary air pump 13. If an error is detected in the secondary air system, which is caused by a defective pump or valve, the type of error is determined in step 370, based for example on the output characteristic of the $O_2$ sensor located downstream of the secondary air outlet. If the air shut-off valve 14 is judged to be defective while it is open, mode A is selected. In step 372, the air-fuel mixture feedback control is stopped. In this case, however, the secondary air system is assumed to be positioned upstream of the $O_2$ sensor used by the secondary air system for feedback control. Then, a determination is made in step 374 whether the throttle valve (TVO) is opened fully. If not, processing is terminated. If it is opened fully, the $O_2$ sensor or the catalyst must be protected. If the engine speed Ne is determined in step 376 to be larger than the preset value a, the supply of fuel (F/C) is stopped to reduce the engine speed in step 378. If the engine speed Ne is less than the preset value a, the air-fuel ratio is made leaner in step 380.

If the valve 14 is found in step 370 to be defective in a closed position, mode B is selected, and a determination is made whether the catalyst is activated in 382. If it is, processing is terminated. If not, the air-fuel mixture is adjusted leaner in step 384. For example, the air-fuel ratio should be shifted to the leaner side or ignition timing should be retarded.

FIG. 22 shows a secondary air system malfunction diagnosis and control block diagram. When a malfunction is detected in the secondary air system, secondary air error detector 390 actuates the diagnosis control unit (D-CTR, 2nd air) 392, which sends a control signal to the engine control unit 160. For example, when feedback control is to be stopped in step 372, the control signal is sent to the feedback control unit 258. The catalyst activation detection unit 394 receives the exhaust gas temperature signal Texh or intake air flow signal Qa and determines whether the catalyst is activated based on that information.

Figure 23:
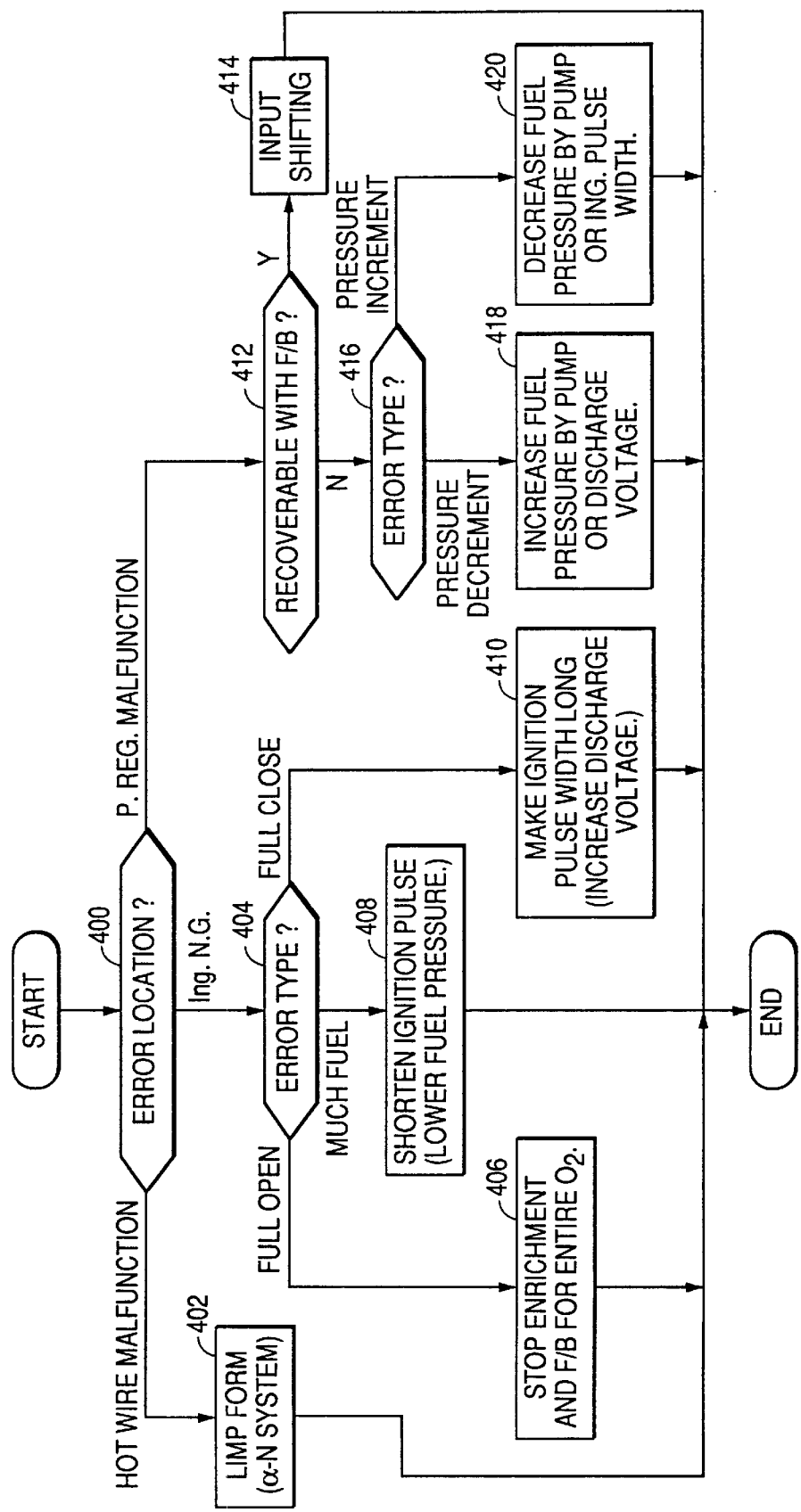
FIG. 23 is a flow chart which shows fuel system error control.
Figure 24:
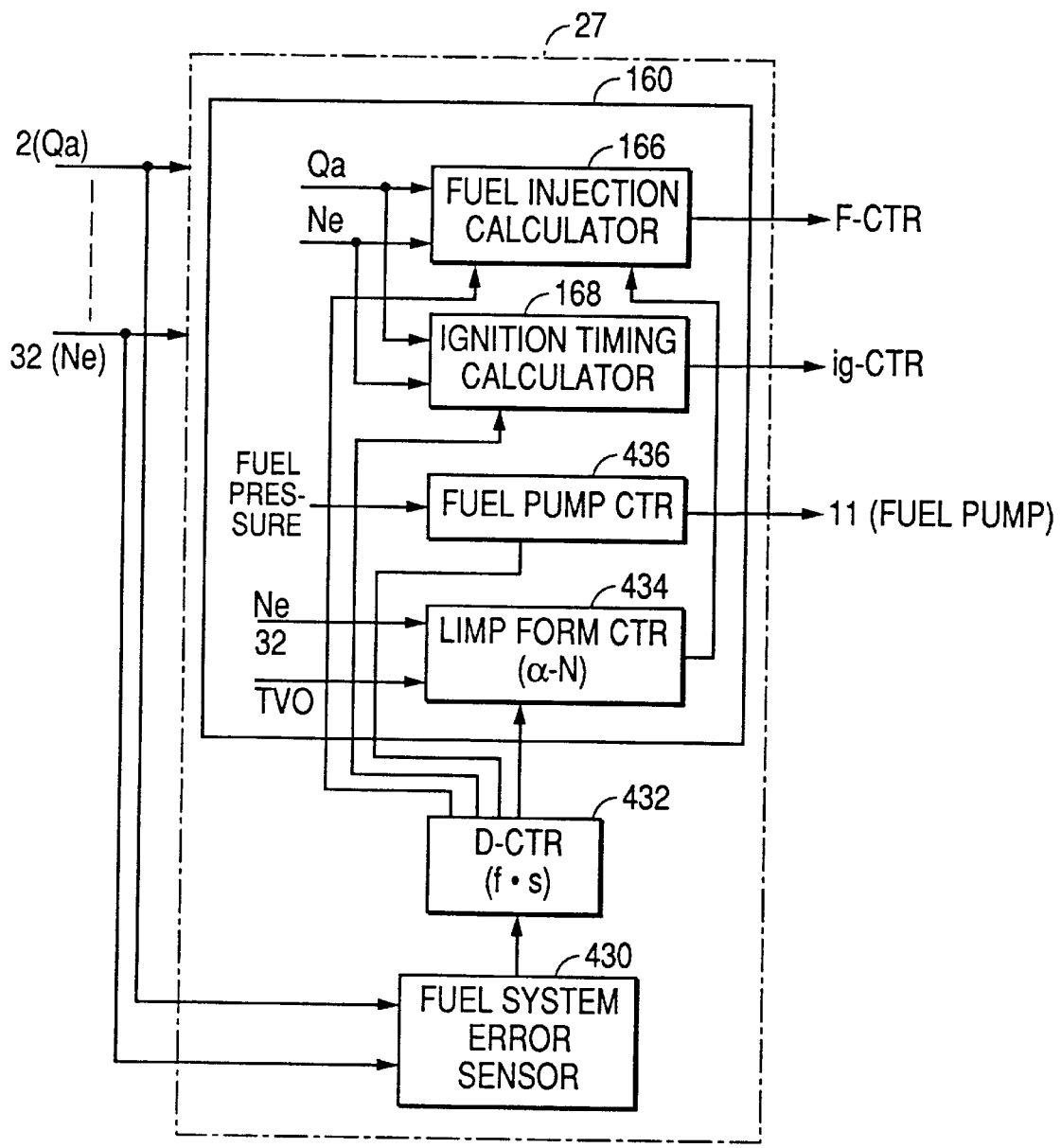
FIG. 24 is a fuel system error control block diagram.

The fuel system diagnosis and control process will be explained below using FIGS. 23 and 24. If a malfunction is detected in the fuel control system, its location is determined in step 400. In this example, 3 possible locations are shown. If the malfunction is determined in step 400 to be in intake air flow sensor (by comparing throttle valve opening with output signals from the hot wire sensor) (hot wire system referred to in the embodiment in FIG. 23), limp home operation is implemented in step 402. In this embodiment, then α-N system operation (in which air flow is estimated based on throttle valve opening and engine speed) is assumed. If an injector malfunction is detected in step 400 (based on the manner in which the feedback correction value varies with engine operating conditions), the particular type of malfunction is determined in step 404. If the injector is opened fully when the error is detected, then fuel pump control is initiated to reduce the fuel pressure, enriching control is stopped in step 406, and air-fuel feedback control is carried out. In this case, the control is not for the air-fuel ratio, but rather to permit continued driving of the vehicle. It would be closer to the limp home operation in step 402. If the injector is not opened fully, but a large flow error is detected in step 404, the fuel injection pulse width is narrowed or the fuel pressure is lowered in step 408. Finally, if the valve is closed fully when the error is detected in step 404, the fuel injection pulse width is widened or the ignition discharge voltage is increased at step 410.

On the other hand, if the malfunction is found to be caused by the pressure regulator (P.Reg.) in step 400 (based again on the variation of the feedback correction value with engine operating conditions), then a further determination is made in step 412 whether feedback control is effective to remedy the error. If it is, so-called shifting control is implemented in step 414. If feedback control not effective, the type of malfunction is determined in step 416. If the problem occurs while the pressure is low, then the pump pressure is increased or the ignition discharge voltage is increased in step 418. If the fuel pump pressure is high when the malfunction is detected, the pressure is lowered or the fuel injection pulse width is shortened in step 420.

If a fuel system malfunction is detected in this manner, the malfunction is located and identified. FIG. 24 shows a block diagram of an arrangement for fuel system diagnosis and control according to FIG. 23. If an error is detected in the fuel system error detector 430, then the diagnosis control unit (D-CTR, f.s.) 432 sends a control signal to the engine control unit 160. For example, when a limp form operation is to be implemented in step 402, the diagnosis control unit 432 sends the control signal to the limp form CTR (α-N) 434 to trigger the limp form CTR. If the fuel pump is to be controlled in step 418 or 420, the control signal is sent to the fuel pump CTR 436 to control the pump.

According to this invention, when an abnormality is detected in the subject vehicle, its location and type are identified. The error correction control is then selected and carried out sequentially based on the type of abnormality and current vehicle operating status. Thus, degradation in the operability of the vehicle, as well as in the exhaust gas characteristics of the vehicle can be minimized.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Method of controlling operation of a vehicle having an internal combustion engine and a plurality of subsystems, said method comprising the steps of:

providing a predetermined set of prioritized counter-measures for remedying predetermined malfunctions of each of said subsystems, and storing said prioritized counter-measures in a memory;

sensing operating parameters of each of said subsystems and providing output signals indicative thereof;

processing said output signals in a data processor to detect a malfunction at least one of said subsystems;

selecting a sequence of prioritized counter-measures depending on the detected malfunction and on the sensed operating parameters;

sequentially implementing said prioritized counter-measures to modify operation of said system in response to control signals from said data processor; and testing said at least one of said subsystems by sensing said operating parameters thereof in response to control signals from said data processor after implementation of each of said counter-measures, to determine effect of said counter-measures;

wherein said selected sequence of corrective measures includes alternative corrective measures for differing operating conditions of said subsystems, and wherein said step of sequentially implementing said corrective measures includes selection of alternative corrective measures in response to changes in operating status of said subsystems sensed in said testing step.

2. Method of controlling operation of a vehicle having an internal combustion engine and a plurality of subsystems, said method comprising the steps of:

providing a predetermined set of prioritized counter-measures for remedying predetermined malfunctions of each of said subsystems, and storing said prioritized counter-measures in a memory;

sensing operating parameters of each of said subsystems and providing output signals indicative thereof;

processing said output signals in a data processor to detect a malfunction at least one of said subsystems;

selecting a sequence of prioritized counter-measures depending on the detected malfunction and on the sensed operating parameters;

sequentially implementing said prioritized counter-measures to modify operation of said system in response to control signals from said data processor; and testing said at least one of said subsystems by sensing said operating parameters thereof in response to control signals from said data processor after implementation of each of said counter-measures, to determine effect of said counter-measures;

wherein said system is a vehicle having an internal combustion engine;

wherein said step of sensing operating parameters includes detection of an engine misfire in a combustion cylinder of said vehicle, wherein control of an accidental or improper fire has priority over control of malfunctions of other subsystems of said vehicle;

wherein said step of sensing operating parameters includes sensing engine speed and engine load of said vehicle; and further comprising additional steps wherein if a misfire is detected when said engine speed is in an idling range or said engine load is smaller than a predetermined value, a first check is made to detect ignition abnormalities in said vehicle and if such an abnormality is detected, to correct such abnormality by increasing magnitude and duration of an ignition current provided to said combustion cylinder;

an additional step wherein if a misfire is detected when said engine load is greater than said predetermined value, fuel supply to said combustion cylinder is interrupted for a predetermined period of time and then resumed;

an additional step wherein if said misfire continues after interruption of said fuel supply, magnitude and duration of an ignition current provided to said combustion cylinder are increased;

an additional step wherein if said misfire is not corrected, fuel supply to said combustion cylinder is stopped; and the further step of modifying operation of other combustion cylinders firing before and after said combustion cylinder in which said misfire is detected, by one of: decreasing fuel flow or retarding ignition timing to said other cylinders.

3. Method of controlling operation of a vehicle having an internal combustion engine and a plurality of subsystems, said method comprising the steps of:

providing a predetermined set of prioritized counter-measures for remedying predetermined malfunctions of each of said subsystems, and storing said prioritized counter-measures in a memory;

sensing operating parameters of each of said subsystems and providing output signals indicative thereof;

processing said output signals in a data processor to detect a malfunction at least one of said subsystems;

selecting a sequence of prioritized counter-measures depending on the detected malfunction and on the sensed operating parameters;

sequentially implementing said prioritized counter-measures to modify operation of said system in response to control signals from said data processor; and testing said at least one of said subsystems by sensing said operating parameters thereof in response to control signals from said data processor after implementation of each of said counter-measures, to determine effect of said counter-measures;

wherein said system is a vehicle having an internal combustion engine;

wherein said subsystems include at least one of: cylinder ignition, exhaust catalyst, $O_2$ sensors, $O_2$ sensor heaters, evaporative fuel system, exhaust gas recirculation valve, second air supply and fuel control system; and wherein said step of sensing operating parameters includes sensing one of engine intake air flow and engine exhaust gas temperature; and comprising the following additional steps an air fuel ratio of said engine of said vehicle is controlled by an air-fuel feedback signal having a periodic cycle; and if a malfunction of said exhaust catalyst is detected when said sensed one of engine intake air flow and engine exhaust gas temperature is smaller than a predetermined value, said cycle of said air-fuel feedback signal is shortened.

4. Method according to claim 3, wherein said engine of said vehicle has a canister purge system which operates when said vehicle is operating normally, and wherein if said sensed one of engine intake air flow and engine exhaust gas temperature is greater than said predetermined value, canister purging is interrupted.

5. Method according to claim 4, comprising the further step of retarding ignition timing of the vehicle engine by a predetermined amount.

6. Method according to claim 5, wherein if said malfunction of said exhaust catalyst is not corrected after retarding said ignition timing, said air-fuel mixture is adjusted to make it leaner and interruption of said canister purging is continued.

7. Method according to claim 5, wherein said step of sequentially implementing said counter-measures further comprises returning said ignition timing to normal following adjustment of the air-fuel mixture and continued interruption of canister purging.

8. Method according to claim 5, wherein if said malfunction of said exhaust gas catalyst is eliminated after retarding said ignition timing, canister purging is restarted and the retarded ignition timing is returned to normal.

9. Method according to claim 5, wherein a check is first made to determine whether the air-fuel mixture has previously been adjusted leaner, and if so, the air-fuel mixture is further adjusted leaner or secondary air flow is increased.

10. Method according to claim 9, wherein if said malfunction of said exhaust gas catalyst is eliminated following adjustment of said air-fuel mixture or said increase of secondary air flow, further leaner adjustment of the air-fuel mixture or increase of secondary air flow is stopped.

11. Method according to claim 9, wherein if said malfunction of said exhaust gas catalyst is not eliminated following said adjustment of said air-fuel mixture or said increase of secondary air flow, then said air-fuel ratio is further adjusted leaner or said secondary air flow is further increased.

12. Method of controlling operation of a vehicle having an internal combustion engine and a plurality of subsystems, said method comprising the steps of:

provuiding a predetermined set of prioritized counter-measures for remedying predetermined malfunctions of each of said subsystems, and storing said prioritized counter-measures in a memory;

sensing operating parameters of each of said subsystems and providing output signals indicative thereof;

processing said output signals in a data processor to detect a malfunction at least one of said subsystems;

selecting a sequence of prioritized counter-measures depending on the detected malfunction and on the sensed operating parameters;

sequentially implementing said prioritized counter-measures to modify operation of said system in response to control signals from said data processor; and testing said at least one of said subsystems by sensing said operating parameters thereof in response to control signals from said data processor after implementation of each of said counter-measures, to determine effect of said counter-measures;

wherein said system is a vehicle having an internal combustion engine;

wherein said subsystems include at least one of: cylinder ignition, exhaust catalyst, $O_2$ sensors, $O_2$ sensor heaters, evaporative fuel system, exhaust gas recirculation valve, second air supply and fuel control system;

wherein said vehicle has an air-fuel ratio feedback control system responsive to an $O_2$ sensor located upstream of said exhaust catalyst; and wherein said step of sensing operating parameters includes:

sensing a degradation index of said $O_2$ sensor located upstream of said exhaust catalyst;

comparing said degradation index to a first predetermined value;

if said degradation index is less than said first predetermined value, changing a gain of said air-fuel ratio feedback control system in response to magnitude of said degradation index.

13. Method according to claim 12, wherein said step of sequentially implementing said counter-measures further comprises:

if said degradation index of said upstream $O_2$ sensor is greater than said first predetermined value, comparing intake airflow of said vehicle with a second predetermined value; and if said intake air flow is less than said second predetermined value, changing operation of said air-fuel ratio feedback control system to respond to a second $O_2$ sensor mounted downstream from said exhaust catalyst.

14. Method according to claim 13 wherein said step of sequentially implementing counter-measures further comprises:

if said intake air flow is larger than said second predetermined value, adjusting said air-fuel ratio to make it leaner.

15. Method according to claim 14, wherein said step of sequentially implementing counter-measures further comprises:

comparing said degradation index with said first predetermined value after adjustment of said air-fuel ratio; and if said degradation index is less than said first predetermined value, changing said gain of said air-fuel ratio feedback control system in response to magnitude of said degradation index.

16. Method according to claim 15, wherein said step of sequentially implementing counter-measures further comprises:

if said degradation index remains greater than said first predetermined value, changing operation of said air-fuel ratio feedback control system to respond to said second $O_2$ sensor.

17. Method of controlling operation of a vehicle having an internal combustion engine and a plurality of subsystems, said method comprising the steps of:

providing a predetermined set of prioritized counter-measures for remedying predetermined malfunctions of each of said subsystems, and storing said prioritized counter-measures in a memory;

sensing operating parameters of each of said subsystems and providing output signals indicative thereof;

processing said output signals in a data processor to detect a malfunction at least one of said subsystems;

selecting a sequence of prioritized counter-measures depending on the detected malfunction and on the sensed operating parameters;

sequentially implementing said prioritized counter-measures to modify operation of said system in response to control signals from said data processor; and testing said at least one of said subsystems by sensing said operating parameters thereof in response to control signals from said data processor after implementation of each of said counter-measures, to determine effect of said counter-measures;

wherein said system is a vehicle having an internal combustion engine;

wherein said subsystems include at least one of: cylinder ignition, exhaust catalyst, $O_2$ sensors, $O_2$ sensor heaters, evaporative fuel system, exhaust gas recirculation valve, second air supply and fuel control system;

wherein said vehicle has an air-fuel ratio control system responsive to output signals from an $O_2$ sensor in an exhaust line thereof, which control system can use either of a feedback (closed loop) control process or an open loop control process, said step of sensing operating parameters includes sensing heater current of said $O_2$ sensor to detect an abnormal condition thereof; and wherein said sequence of corrective measures comprises the steps of:

comparing at least one of intake air flow and exhaust gas temperature of said vehicle with a first preset value; and if it is less than said preset value, air-fuel ratio feedback control responsive to output signals from said $O_2$ sensor is stopped.

18. Method according to claim 17, wherein said step of sequentially implementing counter-measures further comprises adjusting the air-fuel ratio to one of a stoichiometric mixture and a rich side mixture.

19. Method according to claim 18, wherein said step of sequentially implementing counter-measures comprises a further step wherein, if said air-fuel ratio is adjusted to a rich side mixture, initiating secondary air flow.

20. Method according to claim 17, wherein said step of sequentially implementing counter-measures comprises a further step wherein, if said at least one of intake air flow and exhaust gas temperature is greater than said first preset value and less than a second preset value, adjusting gain of said air-fuel ratio control system.

21. Method according to claim 17, wherein said step of sequentially implementing counter-measures comprises a further step wherein, if said at least one of intake air flow and exhaust gas temperature is greater than said first preset value which is larger than said second preset value, then one of the following is implemented:

normal control or correction of feedback control gain.

22. Method of controlling operation of a vehicle having an internal combustion engine and a plurality of subsystems, said method comprising the steps of:

providing a predetermined set of prioritized counter-measures for remedying predetermined malfunctions of each of said subsystems, and storing said prioritized counter-measures in a memory;

sensing operating parameters of each of said subsystems and providing output signals indicative thereof;

processing said output signals in a data processor to detect a malfunction at least one of said subsystems;

selecting a sequence of prioritized counter-measures depending on the detected malfunction and on the sensed operating parameters;

sequentially implementing said prioritized counter-measures to modify operation of said system in response to control signals from said data processor; and testing said at least one of said subsystems by sensing said operating parameters thereof in response to control signals from said data processor after implementation of each of said counter-measures, to determine effect of said counter-measures;

wherein said system is a vehicle having an internal combustion engine;

wherein said subsystems include at least one of: cylinder ignition, exhaust catalyst, $O_2$ sensors, $O_2$ sensor heaters, evaporative fuel system, exhaust gas recirculation valve, second air supply and fuel control system;

wherein said vehicle has an air-fuel ratio control system which can use either a feedback (closed loop) learning control process or an open loop control process; and wherein said step of sensing operating parameters comprises sensing pressure of said evaporative fuel system to detect an evaporative fuel leak; and comprising an additional step wherein if said evaporative fuel leak exceeds a predetermined value, learning control of said air-fuel ratio control system is stopped.

23. Method according to claim 12, wherein said step of sequentially implementing counter-measures comprises a further step wherein, if said air-fuel ratio control system is performing open loop control, size of said leak is estimated based on values of intake air flow, intake manifold pressure and engine speed, and said air-fuel ratio is adjusted in response thereto; and if said air-fuel ratio control system is performing closed loop control, processing is terminated.

24. Method according to claim 12 wherein said step of sequentially implementing counter-measures comprises further steps wherein:

if said evaporative fuel leak is determined to be caused by sticking of a canister purging valve in an open position, learning control of said air-fuel ratio control system is stopped;

if said air-fuel ratio control system is performing open loop control, size of said leak is estimated based on values of intake air flow, intake manifold pressure and engine speed, and said air-fuel ratio is adjusted in response thereto; and if said air-fuel ratio control system is performing closed loop control, processing is terminated.

25. Method of controlling operation of a vehicle having an internal combustion engine and a plurality of subsystems, said method comprising the steps of:

providing a predetermined set of prioritized counter-measures for remedying predetermined malfunctions of each of said subsystems, and storing said prioritized counter-measures in a memory;

sensing operating parameters of each of said subsystems and providing output signals indicative thereof;

processing said output signals in a data processor to detect a malfunction at least one of said subsystems;

selecting a sequence of prioritized counter-measures depending on the detected malfunction and on the sensed operating parameters;

sequentially implementing said prioritized counter-measures to modify operation of said system in response to control signals from said data processor; and testing said at least one of said subsystems by sensing said operating parameters thereof in response to control signals from said data processor after implementation of each of said counter-measures, to determine effect of said counter-measures;

wherein said system is a vehicle having an internal combustion engine;

wherein said subsystems include at least one of: cylinder ignition, exhaust catalyst, $O_2$ sensors, $O_2$ sensor heaters, evaporative fuel system, exhaust gas recirculation valve, second air supply and fuel control system;

wherein said step of sensing operating parameters comprises sensing intake air pressure of said vehicle to detect exhaust gas recirculation flow of said exhaust gas recirculation valve; and wherein said sequence of corrective measures comprises the steps of:

comparing exhaust gas recirculation flow with a first predetermined value;

if it exceeds said predetermined value, checking for new air leaks; and if no new air leak is found, adjusting said air-fuel ratio to make it richer.

26. Method according to claim 25, wherein if said vehicle is operating in an idling mode when said adjusting of said air-fuel ratio is performed, idling speed of said vehicle is increased by a predetermined amount.

27. Method according to claim 25, comprising the further step of:

if a new air leak is detected and idling speed of said vehicle exceeds a predetermined value, stopping fuel supply to said vehicle.

28. Method according to claim 25, wherein said step of sequentially implementing counter-measures comprises the further step of:

comparing said exhaust gas recirculation flow with a second predetermined value which is lower than said first predetermined value, and if it is smaller than said second predetermined value, stopping feedback learning of an air-fuel ratio control system of said vehicle.

29. Method of controlling operation of a vehicle having an internal combustion engine and a plurality of subsystems, said method comprising the steps of:

providing a predetermined set of prioritized counter-measures for remedying predetermined malfunctions of each of said subsystems, and storing said prioritized counter-measures in a memory;

sensing operating parameters of each of said subsystems and providing output signals indicative thereof;

processing said output signals in a data processor to detect a malfunction at least one of said subsystems;

selecting a sequence of prioritized counter-measures depending on the detected malfunction and on the sensed operating parameters;

sequentially implementing said prioritized counter-measures to modify operation of said system in response to control signals from said data processor; and testing said at least one of said subsystems by sensing said operating parameters thereof in response to control signals from said data processor after implementation of each of said counter-measures, to determine effect of said counter-measures;

wherein said system is a vehicle having an internal combustion engine;

wherein said subsystems include at least one of: cylinder ignition, exhaust catalyst, $O_2$ sensors, $O_2$ sensor heaters, evaporative fuel system, exhaust gas recirculation valve, second air supply and fuel control system;

wherein said vehicle has an air-fuel ratio control system which utilizes a feedback control process;

wherein said step of sensing operating parameters includes sensing output characteristics of an $O_2$ sensor downstream of a secondary air outlet of said vehicle to detect and evaluate an abnormality of an air shut off valve of said secondary air supply; and wherein said sequence of corrective measures comprises the step of if said air shut off valve is determined to be frozen in an open position, stopping feedback control of said air-fuel ratio control system.

30. Method according to claim 29, wherein;

if said air shut off valve is determined to be fully said vehicle exceeds a opened and engine speed of predetermined value, stopping fuel supply to said vehicle; and if said air shut off valve is determined to be fully opened and said engine speed is predetermined value, adjusting said air fuel ration to make it leaner.

31. Method according to claim 29, wherein:

if said air shut off valve is determined to be frozen in a closed position, and said catalyst is not activated, adjusting said air-fuel ratio to make it leaner.

32. Method of controlling operation of a vehicle having an internal combustion engine and a plurality of subsystems, said method comprising the steps of:

providing a predetermined set of prioritized counter-measures for remedying predetermined malfunctions of each of said subsystems, and storing said prioritized counter-measures in a memory;

sensing operating parameters of each of said subsystems and providing output signals indicative thereof;

processing said output signals in a data processor to detect a malfunction at least one of said subsystems;

selecting a sequence of prioritized counter-measures depending on the detected malfunction and on the sensed operating parameters;

sequentially implementing said prioritized counter-measures to modify operation of said system in response to control signals from said data processor; and testing said at least one of said subsystems by sensing said operating parameters thereof in response to control signals from said data processor after implementation of each of said counter-measures, to determine effect of said counter-measures;

wherein said system is a vehicle having an internal combustion engine;

wherein said subsystems include at least one of: cylinder ignition, exhaust catalyst, $O_2$ sensors, $O_2$ sensor heaters, evaporative fuel system, exhaust gas recirculation valve, second air supply and fuel control system; and wherein if a malfunction is detected in said fuel control system, said sequence of corrective measures includes the steps of comparing throttle valve opening of said vehicle with output signals of a hot wire of an air flow sensor in said fuel control system to detect a malfunction of said air flow sensor;

if a malfunction of said air flow sensor is detected, estimating air flow based on throttle valve opening and engine speed.

33. Method according to claim 32, wherein said step of sequentially implementing counter-measures comprises additional steps of:

comparing a feedback control signal of said fuel control system with engine operating conditions to detect and evaluate a malfunction of a fuel injector of said vehicle; and if said fuel injector is determined to be frozen in a full open condition, enrichment control of said fuel control system is stopped and feedback control of an air-fuel ratio of said vehicle is performed.

34. Method according to claim 33, wherein said step of sequentially implementing counter-measures comprises an additional step of:

if said fuel injector is determined to be frozen in a fully closed condition, then one of the following is performed: increasing a fuel pulse duration of said injector and increasing a discharge voltage of an ignition system of said vehicle.

35. Method according to claim 32, wherein said step of sequentially implementing counter-measures comprises an additional step of:

comparing a feedback control signal of said fuel control system with engine operating conditions to detect and evaluate a malfunction of a pressure regulator of said fuel control system; and if said malfunction can be eliminated by air-fuel ratio feedback control, then air-fuel feedback control is performed.

36. Method according to claim 35, wherein said step of sequentially implementing counter-measures comprises an additional step of:

if said malfunction cannot be eliminated by air-fuel ratio feedback control, and if said malfunction comprises an abnormally high pressure in said pressure regulator, then one of following is performed: decreasing pump pressure and decreasing a fuel pulse duration of said injector.

37. Method according to claim 35, wherein said step of sequentially implementing counter-measures comprises an addition step of:

if said malfunction cannot be eliminated by air-fuel ratio feedback control, and if said malfunction comprises an abnormally low pressure in said pressure regulator, then one of the following is performed: increasing pump pressure and increasing discharge voltage of an ignition system of said vehicle.

* * * * *